(12) United States Patent
Kallfass et al.

(10) Patent No.: US 11,267,704 B2
(45) Date of Patent: Mar. 8, 2022

(54) OXYGEN GENERATOR AND METHOD FOR TUNING AN OXYGEN PRODUCTION RATE OF AN OXYGEN GENERATOR

(71) Applicant: DIEHL AVIATION GILCHING GMBH, Gilching (DE)

(72) Inventors: Christoph Kallfass, Schwaebisch Hall (DE); Andreas Hinterberger, Munich (DE); Fritz Kuehn, Garching (DE)

(73) Assignee: Diehl Aviation Gilching GmbH, Gilching (DE)

( * ) Notice: Subject to any disclaimer, the term of this patent is extended or adjusted under 35 U.S.C. 154(b) by 301 days.

(21) Appl. No.: 16/525,897

(22) Filed: Jul. 30, 2019

(65) Prior Publication Data

US 2020/0031667 A1    Jan. 30, 2020

(30) Foreign Application Priority Data

Jul. 30, 2018 (EP) ..................... 8186434

(51) Int. Cl.
*C01B 13/02* (2006.01)
*B01J 7/02* (2006.01)

(52) U.S. Cl.
CPC ............. *C01B 13/0225* (2013.01); *B01J 7/02* (2013.01)

(58) Field of Classification Search
None
See application file for complete search history.

(56) References Cited

U.S. PATENT DOCUMENTS

| 2,035,896 A | 3/1936 | Kerwin |
| 6,007,736 A | 12/1999 | Zhang et al. |
| 2011/0073331 A1 | 3/2011 | Ku |
| 2018/0141029 A1 | 5/2018 | Kuehn et al. |

(Continued)

FOREIGN PATENT DOCUMENTS

| DE | 19602149 A1 | 7/1997 |
| EP | 3323471 A1 | 5/2018 |
| EP | 3323782 A1 | 5/2018 |

(Continued)

OTHER PUBLICATIONS

Stein, F., "Neue Anwendungen fuer ionische Fluessigkeiten in der Technik und Medizintechnik", Dissertation, Nov. 19, 2013, Universitaet Rostock.

(Continued)

*Primary Examiner* — Colin W. Slifka
(74) *Attorney, Agent, or Firm* — Laurence A. Greenberg; Werner H. Stemer; Ralph E. Locher

(57) ABSTRACT

An oxygen generator includes a composition for generating oxygen and at least one tuner compact having a core shell structure and including a compound selected from a peroxide decomposition catalyst, an acidic compound or a basic compound. The composition for generating oxygen having an oxygen source, an ionic liquid, a peroxide decomposition catalyst and, if the ionic liquid is an acidic liquid, a basic compound. The oxygen source is a peroxide compound. The ionic liquid is in the liquid state at least in a temperature range from −10° C. to +50° C. The peroxide decomposition catalyst is a metal oxide compound and/or a metal salt. There is also described a method for tuning the oxygen production rate of a composition for generating oxygen, and a device for generating oxygen in a tuned manner.

14 Claims, 6 Drawing Sheets

(56) References Cited

U.S. PATENT DOCUMENTS

2018/0141810 A1   5/2018   Kuehn et al.
2018/0142361 A1   5/2018   Kuehn et al.

FOREIGN PATENT DOCUMENTS

| EP | 3323783 A1 | 5/2018 |
| JP | 31227903 A | 10/1986 |
| WO | 3602063 A1 | 4/1986 |
| WO | 9743210 A1 | 11/1997 |

OTHER PUBLICATIONS

Fluck, E., "New notations in the periodic table", Pure & Appl. Chem., 1988, pp. 431-436, vol. 60, No. 3.

OXYGEN GENERATOR AND METHOD FOR TUNING AN OXYGEN PRODUCTION RATE OF AN OXYGEN GENERATOR

CROSS-REFERENCE TO RELATED APPLICATION

This application claims the priority, under 35 U.S.C. § 119, of European application EP 18186434.9, filed Jul. 30, 2018; the prior application is herewith incorporated by reference in its entirety.

BACKGROUND OF THE INVENTION

Field of the Invention

The present invention relates to oxygen generators, methods and devices for generating oxygen in a tuned manner.

Humans cannot exist without oxygen. In many environments, however, oxygen supply is insufficient or there is a risk of emergency situations involving a shortage of oxygen, for example in SAR (search and rescue) applications, in submarines, in mines, in space capsules, and also in air planes. Air pressure decreases with increasing flight altitude, and at cruising altitudes of many aircrafts, in particular long-range aircrafts, sufficient oxygen for human beings is no longer available. Therefore, the aircraft cabins are pressurized in order to ensure sufficient oxygen supply. In case of a sudden de-pressurization of an aircraft cabin, oxygen masks must be available, which supply oxygen to crew and passengers until the aircraft reaches a flight level where sufficient oxygen is available.

The oxygen which is provided by these emergency systems is typically produced by so-called "chlorate candles" or "oxygen candles". These chemical oxygen generators contain chlorates or perchlorates as an oxygen source, as well as various additives such as fuels, catalysts, binders and moderators. Chlorate candles are often in the form of cylindrical rods, i.e. they have a shape similar to candles. Chlorate candles are disclosed, for example, in U.S. Pat. No. 6,007,736 and its counterpart International publication WO 97/43210.

Prior art chlorate candles require high temperatures at which the oxygen production takes place. Namely, in chlorate candles the decomposition reaction requires a temperature of about 350° C. for initiation, and the oxygen is released at temperatures between 450° C. and 700° C. Therefore, effective heat insulation of chlorate candles is required, resulting in a weight and size penalty. Furthermore, decomposition of chlorates and perchlorates tends to produce toxic side products, in particular chlorine, which must be removed from the oxygen stream, thus additionally adding size and weight. Furthermore, there is a risk of system failure. In chlorate candles the reaction zone is normally liquid, i.e. there is a liquid zone traveling through the candle, starting at the point of ignition. The liquid zone within the otherwise solid candle considerably destabilizes the candle such that mechanical shocks or even slight vibrations may result in separation of the candle portions, thus interrupting the heat transfer and discontinuing the chlorate or perchlorate decomposition. In such a case, oxygen production may be interrupted, although oxygen is still vitally needed.

A different type of chemical oxygen generators uses peroxides as oxygen sources, for example sodium percarbonate, sodium perborate, or an urea adduct of hydrogen peroxide. Decomposition of the peroxides yields oxygen, and the decomposition reaction can be started by contacting the peroxide compounds with an appropriate enzyme or transition metal catalyst. Chemical oxygen generators of this type are disclosed in U.S. Pat. No. 2,035,896, in international publication WO 86/02063, in Japanese publication JP 61227903 A, and in German published patent application DE 196 02 149 A1.

Many known peroxide-based oxygen generators use water for providing contact between the peroxides and the catalysts. Unfortunately, water freezes at 0° C. and, therefore, no oxygen can be produced below 0° C., while some emergency systems must be operational below 0° C. Also, the decomposition of peroxides in aqueous solutions may result in vehement effervescing of the reaction mixture. As a consequence, an oxygen generating device containing a peroxide-based oxygen generating composition must have a complicated structure.

A new concept is disclosed in U.S. patent application publication US 2018/0141810 A1 and its counterpart European publication EP 3 323 782 A1. Those documents disclose compositions and methods for generating oxygen from peroxides in ionic liquids. The compositions comprise at least one oxygen source, at least one ionic liquid, and at least one metal oxide compound, wherein the oxygen source comprises a peroxide compound, the ionic liquid is in the liquid state at least in a temperature range from −10° C. to +50° C., and the metal oxide compound is an oxide of one single metal or of two or more different metals, said metal(s) being selected from the metals of groups 2 to 14 of the periodic table of the elements.

The use of ionic liquids provides for distinct advantages. Ionic liquids are environmentally friendly compounds. They are liquid over a broad temperature range and exhibit a low to non-existing vapor pressure. Moreover, these liquids are non-flammable and are even used as flame retardants which make them highly attractive for the use in an air plane. Many of their other properties can be varied by changing their molecular structures. Their high heat capacity enables them to dissipate the reaction heat from the decomposition of peroxides to oxygen.

The compositions disclosed in US 2018/0141810 A1 and EP 3 323 782 A1 produce breathable oxygen reliably and continuously in a wide temperature range, also including subfreezing temperatures. The oxygen produced is at a low temperature, such as below 150° C. or even lower. It is typically free from toxic or otherwise noxious components such as chlorine or carbon monoxide. The compositions are capable to produce oxygen over an extended period of time and with a significant flow rate, and promptly upon demand.

However, all oxygen generating compositions described above have in common that they produce oxygen at a flow rate inherent to the particular system. The oxygen flow rate can be neither increased nor decreased, and once the decomposition reaction of the oxygen source has started, it cannot be stopped until all of the oxygen source has been decomposed. Thus, there may be situations, where too much oxygen is produced within a short time, i.e. the oxygen source is decomposed too rapidly, and also situations where an increased oxygen flow rate would be advantageous.

Furthermore, oxygen generating compositions do not produce oxygen with a constant flow rate. Rather, in the progress of the peroxide decomposition reaction the oxygen flow rate either increases or decreases or fluctuates. This is disadvantageous in all applications where a substantially constant oxygen flow rate is required, for example in medical systems intended for supplying oxygen to a patient suffering from a lung disease, or in oxygen supply systems intended for providing breathable oxygen to people staying in an environment lacking breathable oxygen, for example in space capsules or submarines. In such environments, oxygen supply with a substantially constant flow rate and over an extended period of time is required.

SUMMARY OF THE INVENTION

It would be beneficial to provide a solution to at least some of the problems of the prior art outlined above and to provide an oxygen generator allowing to modify the oxygen production rate, i.e. to increase or decrease the oxygen flow rate. It would be also beneficial to provide an oxygen generator which allows to stop the oxygen production when no oxygen is needed, and to restart the oxygen production whenever oxygen is needed.

In addition, it would be beneficial if this oxygen generator would be capable of producing breathable oxygen reliably and continuously in a wide temperature range, and preferably including subfreezing temperatures. The oxygen produced should be at a low temperature, such as below 150° C. or even lower. Desirably, the oxygen should be free from toxic or otherwise noxious components such as chlorine or carbon monoxide. It would be also beneficial if the oxygen generator would be capable to produce oxygen over an extended period time and with a significant flow rate, and preferably promptly upon demand.

Further, it would be beneficial if the oxygen generator would be capable to provide oxygen with a substantially constant flow rate automatically, i.e. without influencing the oxygen generating system from outside the system.

With the above and other objects in view there is provided, in accordance with the invention, an oxygen generator, comprising a composition for generating oxygen, the composition including an oxygen source, a catalyst, an ionic liquid and, if the ionic liquid is acidic, a basic compound;

at least one tuner compact having a core shell structure including a core and one or more shell layers; wherein a first shell layer completely surrounds the core and each further shell layer completely surrounds a respectively underlying shell layer;

at least one of the core and the one or more shell layers consisting of or comprising a compound selected from the group consisting of a catalyst, an acidic compound, and a basic compound, wherein mixtures comprising both an acidic compound and a basic compound, or comprising both an acidic compound and a catalyst, within the core or within the same shell layer are excluded; and the core and the one or more shell layers being configured to decompose or dissolve or disintegrate upon coming into contact with the composition for generating oxygen; and the oxygen source comprising a peroxide compound;

the ionic liquid being in the liquid state at least in a temperature range from −10° C. to +50° C.; and the catalyst being a metal oxide compound and/or a metal salt, the metal oxide compound being an oxide of a single metal or of two or more different metals selected from the metals of groups 2-14 of the periodic table of elements, and the metal salt comprising one single metal or two or more different metals, and an organic and/or an inorganic anion.

In other words, exemplary embodiments of the invention include an oxygen generator comprising a composition for generating oxygen, the composition comprising an oxygen source, a catalyst, an ionic liquid and, if the ionic liquid is acidic, a basic compound, at least one tuner compact having a core shell structure comprising a core and one or more shell layers, wherein a first shell layer completely surrounds the core and each further shell layer completely surrounds the underlying shell layer, at least one of the core and the one or more shell layers consists of or comprises a compound selected from a catalyst, an acidic compound or a basic compound, with mixtures comprising both an acidic compound and a basic compound or comprising both an acidic compound and a catalyst within the core or within the same shell layer being excluded, and the core and the one or more shell layers are capable of decomposing or dissolving or disintegrating upon contact with the composition for generating oxygen, and further wherein the oxygen source comprises a peroxide compound, the ionic liquid is in the liquid state at least in the temperature range from −10° C. to +50° C., and the catalyst is a metal oxide compound and/or a metal salt, wherein the metal oxide compound is an oxide of a single metal or of two or more different metals, said metal(s) being selected from the metals of groups 2-14 of the periodic table of the elements, and wherein the metal salt comprises one single metal or two or more different metals, and an organic and/or an inorganic anion.

Further exemplary embodiments of the invention include a method for tuning the oxygen production rate of a composition for generating oxygen, the method comprising providing an oxygen source, providing an ionic liquid, providing a catalyst, providing at least one tuner compact having a core shell structure comprising a core and one or more shell layers, wherein a first shell layer completely surrounds the core, and each further shell layer completely surrounds the underlying shell layer, at least one of the core and the one or more shell layers consists of or comprises a compound selected from a peroxide decomposition catalyst, an acidic compound or a basic compound, with mixtures comprising both an acidic compound and a basic compound or comprising both an acidic compound and a catalyst within the core or with the same shell layer being excluded, and the core and the one or more shell layers are capable of decomposing or dissolving or disintegrating upon contact with the oxygen source, the ionic liquid and the peroxide decomposition catalyst, generating oxygen by contacting the oxygen source, the ionic liquid and the peroxide decomposition catalyst, or if the ionic liquid is an acidic liquid, generating oxygen by contacting the oxygen source, the ionic liquid and the peroxide decomposition catalyst with a basic compound, and contacting the at least one tuner compact with the oxygen source, the ionic liquid, the catalyst and, if present, the basic compound, thereby liberating the compounds contained in the tuner compact, with compounds contained in the outermost shell layer being liberated first and compounds contained in the core being liberated last, wherein the oxygen source comprises a peroxide compound, the ionic liquid is in the liquid state at least in a temperature range from −10° C. to +50° C., the metal oxide compound is an oxide of a single metal or of two or more different metals, said metal(s) being selected from the metals of groups 2 to 14 of the periodic table of the elements, and the metal salt comprises one single metal or two or more different metals, and an organic and/or an inorganic anion.

Further exemplary embodiments of the invention include a device for generating oxygen in a tuned manner, the device comprising a reaction chamber housing a composition for generating oxygen, the composition comprising a combination of constituents consisting of an oxygen source, a peroxide decomposition catalyst, an ionic liquid and, if the ionic liquid is an acidic liquid, a basic compound, and housing at least one tuner compact, the tuner compact having a core shell structure comprising a core and one or more shell layers, wherein a first shell layer completely surrounds the core, and each further shell layer completely surrounds the underlying shell layer, at least one of the core and the one or more shell layers consists of or comprises a compound selected from a peroxide decomposition catalyst, an acidic compound or a basic compound, with mixtures comprising both an acidic compound and a basic compound or comprising both an acidic compound and a catalyst within the core or within the same shell layer being excluded, and the core and the one or more shell layers are capable of decomposing or dissolving or disintegrating upon contact with the composition for generating oxygen, means for maintaining at least one of the oxygen source, the peroxide decomposition catalyst and the ionic liquid physically separated from the remaining constituents, and (if the outermost shell layer of the tuner compact is soluble in the ionic liquid) for maintaining the tuner compact physically separated from the ionic liquid, or, if the ionic liquid is an acidic liquid, means for maintaining the basic compound physically separated from the ionic liquid, and (if the outermost shell layer of the tuner compact is soluble in the ionic liquid) for maintaining the tuner compact physically separated from the ionic liquid, means for establishing physical contact of the oxygen source, the peroxide decomposition catalyst, the ionic liquid, the at least one tuner compact and, if present, the basic compound, and means for allowing oxygen to exit the reaction chamber, wherein the oxygen source comprises a peroxide compound, the ionic liquid is in the liquid state at least in a temperature range from −10° C. to +50° C., the metal oxide compound is an oxide of a single metal or of two or more different metals, said metal(s) being selected from the metals of groups 2 to 14 of the periodic table of the elements, and the metal salt comprises one single metal or two or more different metals, and an organic and/or an inorganic anion.

Technical implementations of the inventive concept as claimed herein include an oxygen generator comprising a composition for generating oxygen and a tuner compact having a core shell structure, a method for tuning the oxygen production rate of the oxygen generator, and a device for generating oxygen in a tuned manner.

In the method of this invention, oxygen is produced from the composition for generating oxygen, and the oxygen production rate is tuned by adding a tuner compact liberating an acidic compound or a basic compound and/or a peroxide decomposition catalyst, depending on whether the oxygen production rate shall be decreased, increased, stopped, or stopped and restarted.

As can be easily understood, the constituents of the composition for generating oxygen are the same, irrespective of which technical implementation of the invention is contemplated. Therefore, any disclosure provided for a particular implementation, such as composition, oxygen generator, method or device is analogously applicable to the other implementations of this invention.

A composition for generating oxygen, an oxygen generator, a method for tuning the oxygen production rate, and a device for generating oxygen in a tuned manner in the sense of this invention is a composition, generator, method or device intended for generating oxygen, while any composition, generator, method or device yielding oxygen as a side reaction product does not constitute a composition, a generator, a method or device in the sense of this invention.

The compositions for generating oxygen according to exemplary embodiments of the invention comprise at least the following constituents: a peroxide compound as an oxygen source, a metal oxide compound as a catalyst triggering the oxygen release reaction, and an ionic liquid as a carrier for providing contact between the oxygen source and the catalyst, and for dissipating the heat generated during the peroxide decomposition reaction. If the ionic liquid is acidic, the compositions for generating oxygen also contain a basic compound for neutralizing the acidic liquid.

The compositions for generating oxygen according to further exemplary embodiments of the invention comprise at least the following constituents: a peroxide compound as an oxygen source, a metal salt as a catalyst triggering the oxygen release reaction, and an ionic liquid as a carrier for providing contact between the oxygen source and the catalyst, and for dissipating the heat generated during the peroxide decomposition reaction. Again, if the ionic liquid is acidic, the compositions for generating oxygen also contain a basic compound.

In exemplary embodiments the metal salt is soluble in the ionic liquid. The term "soluble" means that essentially the complete amount of the metal salt of a particular oxygen generating composition can be dissolved in the amount of ionic liquid used in this particular composition. The ratio of oxygen source:ionic liquid:metal salt can be varied, however, due to space constraints and also for economical reasons it is advantageous to keep the amount of ionic liquid reasonably small. Therefore, for the purpose of this invention, "soluble" means a solubility of at least 10 nmol (nanomol) metal salt in 1 g ionic liquid. In further exemplary embodiments, the metal salt is only partially soluble or insoluble in the ionic liquid. Typically, the metal salt catalysts have at least some solubility, i.e. are partially soluble.

Metal oxide catalysts are, at most, partially soluble, i.e. have a solubility of less than 10 nmol/1 g ionic liquid, or insoluble, i.e. have a solubility of less than 0.1 nmol metal oxide/1 g ionic liquid.

Peroxide compounds such as hydrogen peroxide adduct compounds, can be decomposed in ionic liquids by contacting them with metal salts or metal oxide compounds in a similar manner as metal salts in aqueous solution, but without the disadvantages of reactions catalyzed by metal salts in aqueous solutions. Exemplary compositions of this invention do not contain any water. In particular, decomposition of peroxide compounds in ionic liquids yields breathable oxygen at low temperatures, and without requiring bulky thermal insulations for the oxygen generating device.

This can be attributed to the use of ionic liquids as a medium for providing contact between the oxygen source and the catalyst.

Ionic liquids are salts in the liquid state. Therefore, any salt that melts without decomposing or vaporizing yields an ionic liquid. Sometimes, salts which are liquid below the boiling point of water are considered as ionic liquids. Technically interesting are in particular those ionic liquids which are in the liquid state at relatively low temperatures such as at room temperature or even below room temperature.

An ionic compound is considered as an ionic liquid herein when it is in the liquid state at least in a temperature range from −10° C. to +50° C. (at standard pressure of $10^5$ Pa). Exemplary ionic liquids are in the liquid state at least from −30° C. to +70° C., and further exemplary ionic liquids are in the liquid state in an even broader temperature range such as from −70° C. to +150° C.

The properties of ionic liquids can be modified and adapted to the particular needs by varying the chemical structure. Typically, ionic liquids are thermally stable, have wide liquid regions, a high heat capacity and nearly no vapor pressure. Most of them are incombustible. They can be even used as flame retardants. Reference is had to US patent application publication US 2011/0073331 A1, which discloses ionic liquid flame retardants, and points to literature that discloses preparation methods. See, paragraph [0127] of US 2011/0073331 A1.

As indicated above, the ionic liquids used in the present invention should be in the liquid state at a low temperature, such as down to −10° C., or down to −30° C. or even below. Such ionic liquids are salts consisting of organic cations and organic or inorganic anions, and both cations and anions are bulky. In exemplary embodiments, they are bulky and asymmetric. As a general rule, the melting temperature decreases with increasing bulkiness and decreasing symmetry of cations and anions. Combinations of highly bulky and asymmetric cations and anions may not freeze down to temperatures as low as −120° C. Many ionic liquids are available which are liquid at −70° C. and above.

Suitable cations are, for example, imidazolium, pyrrolidinium, ammonium, pyridinium, pyrazolium, piperidinium, phosphonium, and sulfonium cations. The cations may or may not have substituents. Particularly, the cations may have one or more substituents, for example alkyl side chains such as methyl, ethyl or butyl side chains. The substitution may be symmetric or asymmetric.

Suitable anions include, for example, dimethylphosphate, methylsulfate, ethylsulfate, trifluoromethylsulfonate, bis(trisfluoromethylsulfonyl)imide, chloride, bromide, iodide, tetrafluoroborate, hexafluorophosphate, acetate, and but-3-enoate. In the case of "small" anions such as chloride, bromide, and iodide, particularly bulky cations can be selected, in order to provide for the desired low temperature liquidity.

Some exemplary ionic liquids are
1-butyl-3-methylimidazoliumdimethylphosphate ([BMIM][PO$_4$Me$_2$]),
1,3-dimethylimidazoliumdimethylphosphate ([MMIM][PO$_4$Me$_2$]),
1-butyl-3-methylimidazoliumacetate ([BMIM][OAc]),
1-ethyl-3-methylimidazoliumethylsulfate ([EMIM][EtSO$_4$]),
tetraethylammonium but-3-enoate ([NEt$_4$][but-3-enoat]),
1,3-dimethylimidazoliummethylsulfate ([MMIM][MeSO$_4$]),
1-butyl-3-methylimidazoliummethylsulfate ([BMIM][MeSO$_4$]),
1,1-butylmethylpyrrolidiniumbis(trifluoromethylsulfonyl)imide ([BMPyrr][TFSI]),
butyltrimethylammoniumbis(trifluoromethylsulfonyl)imide ([Me$_3$BuN][TFSI]),
1-butyl-3-methylimidazoliumtrifluoromethanesulfonate ([BMIM][OTf]),
1-ethyl-3-methylimidazolium acetate ([EMIM][OAc]),
tetrabutylammonium arginine ([TBA][Arg]),
trimethylammonium propanesulfonic acid hydrogen sulfate ([TMPSA][HSO$_4$]),
1-(4-sulfobutyl)-3-methylimidazolium hydrogen sulfate ([SBMIM][HSO$_4$]),
diethylmethylammonium methansulfonate ([NEt$_2$MeH][MeSO$_3$]), and
1-ethyl-3-methylimidazolium hydrogen sulfate ([EMIM][HSO$_4$]).

[NEt$_4$][but-3-enoate], [EMIM][OAc] and [TBA][Arg] are basic ionic liquids, and [TMPSA][HSO$_4$], [SBMIM][HSO$_4$], [NEt$_2$MeH][MeSO$_3$] and [EMIM][HSO$_4$] are acidic ionic liquids.

Further ionic liquids can be found in "Neue Anwendungen für ionische Flüssigkeiten in der Technik and Medizintechnik" (New applications for ionic liquids in technology and medical technology), Dissertation by F. Stein, University of Rostock, Germany, 2014, at page 43.

The ionic liquids usable herein are, however, not particularly limited. It is only required that they are liquid and stable (i.e. they do not decompose) in the desired temperature range. Of course, the ionic liquids should not react with any constituents of the oxygen generating composition and of the tuner compacts. The ionic liquids may be used singly or in combinations of two or more. Thus, in exemplary embodiments, this invention uses ionic liquid formulations containing one or more ionic liquids and, optionally, containing further additives which do not detrimentally interfere with the peroxide decomposition reaction.

As an oxygen source, peroxide compounds, in particular solid hydrogen peroxide adduct compounds are used. Solid hydrogen peroxide adduct compounds constitute suitable and stable substituents for liquid hydrogen peroxide, are easily storable, long term stable and safe to work with. Exemplary oxygen sources are alkali percarbonates, e.g. sodium percarbonate (Na$_2$CO$_3$×1.5H$_2$O$_2$), alkali perborates, e.g. sodium perborate (NaBO$_3$×4H$_2$O, NaBO$_3$×H$_2$O), and urea hydrogen peroxide (UHP). In UHP urea and hydrogen peroxide are present in a molar ratio of about 1:1.

The peroxide compounds are not particularly limited, as long as they are stable under usual storage conditions. Exemplary peroxide compounds are stable also at elevated temperatures, for example in the vicinity of a fire. The peroxide compounds can be soluble or partially soluble or insoluble in the ionic liquids. The peroxide compounds can be used singly or in combinations of two or more, i.e. as oxygen source formulations containing, optionally, further additives which do not detrimentally interfere with the peroxide decomposition reaction.

In exemplary embodiments, the decomposition reaction of the peroxide compound is catalyzed by metal oxide compounds. Suitable metal oxide compounds are, for example, those which are known to catalyze the decomposition of peroxides in aqueous solutions.

Generally speaking, metal oxide compounds catalyzing peroxide decomposition in compositions comprising ionic liquids, are oxides of one single metal or of two or more different metals. The metal or the metals are selected from the group which consists of the elements of groups 2 to 14 of the periodic table of the elements. The periodic table has 18 groups (see: Pure and Applied Chemistry, vol. 60, 3, pages 431-436).

In exemplary embodiments the metal oxide compound is an oxide of one or more metals belonging to the fourth period of the periodic table of the elements. In an alternative embodiment, the metal oxide compound is an oxide comprising, in addition to one or more metals belonging to the fourth period, one or more metal(s) belonging to the second and/or third and/or fifth and/or sixth period(s).

In further exemplary embodiments, the metal oxide compound is an oxide of one or more metals belonging to the fifth and/or sixth period of the periodic table.

In all embodiments, each metal may be present in one single oxidation state or in different oxidation states.

The metal oxide compounds may be used singly or in combinations of two or more different metal oxide compounds, i.e. metal oxide formulations may be used comprising one or more metal oxide compounds and, optionally, further additives which do not detrimentally interfere with the peroxide decomposition reaction.

Many metal oxide compounds are transition metal oxides. Such transition metal oxides may contain one transition metal, and may as well contain two or more different transition metals. Each transition metal may be present in one single or in different oxidation states. In addition, the transition metal oxides may contain one or more non-transition metals. The transition metal oxides may be used singly or in combinations of two or more different transition metal oxides.

Exemplary transition metal oxide catalysts include oxides of manganese, cobalt, chromium, silver and copper, and mixed oxides of iron and another transition metal such as cobalt, copper, nickel, or manganese, mixed oxides of manganese and another transition metal such as cobalt, nickel, or copper, and mixed oxides containing nickel and cobalt.

As regards structural types, spinel type oxides, ilmenite type oxides, and perovskite type oxides may be specifically mentioned.

As exemplary compounds catalyzing the peroxide decomposition reaction may be mentioned: manganese (IV) oxide ($MnO_2$), cobalt (II, III) oxide ($Co_3O_4$), chromium (VI) oxide ($CrO_3$), silver (I) oxide ($Ag_2O$), Fe (II, III) oxide ($Fe_3O_4$), and copper (II) oxide (CuO), as well as spinel type mixed metal oxides like cobalt iron oxide ($Co_xFe_{3-x}O_4$, with $0 \leq x \leq 3$), such as $CoFe_2O_4$, $Co_{1.5}Fe_{1.5}O_4$, and $Co_2FeO_4$, copper iron oxide ($Cu_xFe_{3-x}O_4$, with $0 \leq x \leq 3$), such as $CuFe_2O_4$, nickel iron oxides ($Ni_xFe_{3-x}O_4$, with $0 \leq x \leq 3$), manganese iron oxides ($Mn_xFe_{3-x}O_4$, with $0 \leq x \leq 3$), copper manganese oxides such as $Cu_{1.5}Mn_{1.5}O_4$, cobalt manganese oxides such as $Co_2MnO_4$, nickel cobalt oxides such as $NiCo_2O_4$, as well as ilmenite type oxides like nickel manganese oxides such as $NiMnO_3$ or oxides containing more than two transition metals, for example $LaFe_xNi_{1-x}O_3$, with $0 \leq x \leq 1$, or $La_xSr_{1-x}MnO_3$ with $0 \leq x \leq 1$.

Transition metals as understood herein are those elements which have an incomplete d-shell, or which may form ions having an incomplete d-shell, including lanthanides and actinides. It goes without saying that only oxides may be used which undergo a redox reaction with hydrogenperoxide. Zincoxide, for example, may not be used as a catalyst, although zinc constitutes a transition metal. It is, however, stressed that the metal oxide compounds are not limited to transition metal oxides. Rather, the metal oxide compounds may be oxides of main group metals, such as $PbO_2$, or oxides of main group metals and transition metals in combination, such as $La_{0.5}Sr_{0.5}MnO_3$.

In further exemplary embodiments, the decomposition reaction of the peroxide compound is catalyzed by metal salts. The metals salts comprise one single metal or two or more different metals and an organic and/or an inorganic anion.

In exemplary embodiments the metal salt is soluble in the ionic liquid, and in further exemplary embodiments, the metal salt is not soluble or partially soluble in the ionic liquid. Selecting a metal salt and an ionic liquid such, that the desired amount of metal salt is completely dissolved in the desired amount of ionic liquid provides the advantage that the metal salt and the ionic liquid can be provided in the form of one single homogeneous component. The solutions are stable, and even during long term storage, no sedimentation takes place. Providing the metal salt and the ionic liquid in the form of a homogeneous solution simplifies the design of oxygen generating devices, results in a higher activity of the mixture of catalyst and ionic liquid and, in turn, reduces the required amount of catalyst. A further advantage is the prolonged shelve life of the compositions, as compared to compositions containing the catalyst in suspended form.

The solubility behavior of metal salts in ionic liquids is, at least roughly, analogous to the solubility behavior in water. Therefore, if readily soluble catalysts are desired, metal salts known to be readily soluble in water can be used, and if hardly soluble catalysts are desired, metal salts known to be hardly soluble in water can be used.

As regards inorganic anions, anions such as chlorides, sulfates, carbonates, hydroxides, and nitrates are known to provide water solubility, and as regards organic anions, anions such as chelating agents, i.e. anions forming coordination complexes with metals, are known to provide water solubility.

Accordingly, in exemplary embodiments, the metal salt is at least one selected from the group consisting of chlorides, sulfates, carbonates, hydroxides and nitrates. Metal salts having these inorganic anions are generally well soluble in many ionic liquids.

In further exemplary embodiments, the metal salt is at least one selected from the group consisting of acetates, acetylacetonates, oxalates, tartrates, and citrates. Metal salts having these chelating organic anions are generally well soluble in many ionic liquids.

In further exemplary embodiments, a fraction of the organic or inorganic anions is substituted by oxygen anions, thus yielding mixed catalysts, i.e. metal compounds comprising both oxidic anions and inorganic anions or organic anions, or even metal compounds comprising oxidic anions, inorganic anions, and organic anions.

The metal salt, in exemplary embodiments, contains one single metal, optionally in different oxidation states, the metal being selected from the metals belonging to groups 5 to 14 and periods 4 to 6 of the periodic table of the elements. The periodic table has 18 groups and 7 periods (see: *Pure and Applied Chemistry*, 1988, Vol. 60, No. 3, pages 431-436).

In further exemplary embodiments, the metal salt comprises at least two different metals, with at least one metal being selected from the metals belonging to groups 5 to 14 and periods 4 to 6 of the periodic table of the elements.

The metal salts may be used singly or in combinations of two or more different metal salts. The salts may have different cations or different anions or both different cations and different anions. The metal salts may be provided in the form of metal salt formulations, i.e. the catalyst may be one single metal salt or a combination of two metal salts, and optionally additives which do not detrimentally interfere with the peroxide decomposition reaction may also be contained.

The metal salt comprises at least one metal in an oxidation state allowing a reaction with hydrogen peroxide, assuming basic conditions in aqueous reaction media, i.e. the redox potential of the oxidation state transition which the metal undergoes during the catalytic reaction must allow a reaction with hydrogen peroxide.

Exemplary metal salt catalysts include salts of vanadium, chromium, manganese, iron, cobalt, copper, molybdenum, ruthenium, iridium, and lead. Exemplary oxidation states are +2 for vanadium, +3 and +6 for chromium, +2 and +3 for manganese, +2 and +3 for iron, +2 for cobalt, +1 and +2 for copper, +6 for molybdenum, +3 for ruthenium, +3 for iridium, and +2 and +4 for lead.

As exemplary inorganic salts catalyzing the peroxide decomposition reaction may be mentioned: $PbCl_2$, $CrCl_3$, $CoCl_2$, $CoCO_3$, $CoSO_4$, $IrCl_3$, $MnCl_2$, $VCl_2$, $KCr(SO_4)_2$, $FeCl_3$, $CuCl_2$, and their respective hydrates.

As exemplary organic salts catalyzing the peroxide decomposition reaction may be mentioned: $Mn(OAc)_2$, $Mn(OAc)_3$, $Mn(acac)_2$, $Mn(oxalate)$, $Pb(acac)_2$, $Pb(OAc)_2$, $Pb_3(citrate)_2$, $Pb(tartrate)$, $Co(OAc)_2$, $MoO_2(acac)_2$, $Ru(acac)_3$ and their respective hydrates. OAc means acetate and acac means acetylacetonate.

The above listed inorganic and organic salts constitute active catalysts in many ionic liquids.

The compositions for generating oxygen may comprise from about 10 to 80 weight % of one or more oxygen sources, from about 20 to 80 weight % of one or more ionic liquids, and from more than 0 up to about 15 weight % of one or more metal salt catalysts or from more than 0 up to about 20 weight % of one or more metal oxide catalysts. In exemplary embodiments, the oxygen source or mixture of oxygen sources constitutes from 50 to 70 weight %, the ionic liquid or mixture of ionic liquids constitutes from 30 to 60 weight %, and the catalyst or mixture of catalysts constitutes from more than 0 up to about 10 weight % of the composition. In some embodiments, the oxygen source may constitute up to 98 weight % of the composition, with the amounts of ionic liquid and catalyst being present in amounts as low as about 1% by weight, each. Optionally, further constituents may be present, for example silicon dioxide (as a heat sink), radical scavengers such as resorcinol, 2-methylhydrochinone, eugenol, phenol, and 4-propylphenol, all of which reduce the peroxide decomposition rate. In some embodiments, the amounts of such additional constituents do not exceed about 20 weight % of the composition. All constituents together add up to 100 weight %.

In the case of acidic ionic liquids exemplary compositions also comprise a basic compound. The basic compound is added in an amount which is at least sufficient to neutralize the ionic liquid. The amounts of the remaining constituents of the compositions are lessened proportionally.

In the context herein, the term "composition" includes embodiments wherein all constituents of the composition are mixed, i.e. they are in contact with each other, as well as embodiments wherein the constituents are not in contact with each other, i.e. are physically separated, or wherein at least not all constituents are in contact with each other. It must be considered that a mixture comprising an ionic liquid, a peroxide compound dissolved or dispersed therein, and a catalyst, is not stable. Rather, the decomposition of the peroxide compound starts as soon as the catalyst comes into contact with the peroxide compound, in the ionic liquid, or at least shortly thereafter. Therefore, the constituents of the composition for generating oxygen must be stored in a condition wherein the catalyst cannot trigger the release of oxygen from the peroxide compound. This can be achieved by providing the composition for generating oxygen in the form of a "kit of parts", i.e. as a combination of at least two components, the two components comprising the at least one oxygen source, the at least one ionic liquid, and the at least one catalyst compound. In the at least two components, at least one of the three constituents (the oxygen source(s), the ionic liquid(s), and the catalyst is not in contact with the other constituents of the composition for generating oxygen.

For example, the composition may comprise a first component and a second component, the first component comprising the oxygen source and the catalyst, and the second component comprising the ionic liquid.

The situation is different when the ionic liquid has acidic properties or when the ionic liquid contains a compound having acidic properties.

The inventors have found that the peroxide decomposition reaction does not proceed in an acidic environment. Therefore, in compositions for generating oxygen which contain an acidic ionic liquid, the peroxide, the catalyst and the ionic liquid do not need to be stored physically separated, but can be in contact with each other, e.g. mixed. The inventors have further found, that in compositions for generating oxygen comprising an acidic ionic liquid, the peroxide decomposition reaction can be started by adding a basic compound to the ionic liquid, the catalyst and the peroxide.

In exemplary embodiments, the oxygen generator comprises the composition for generating oxygen and at least one tuner compact. The tuner compact is designed to tune the velocity of the peroxide decomposition, i.e. to adjust the oxygen flow rate according to needs.

In exemplary embodiments, the tuner compacts comprise compounds which are able to increase or decrease the velocity of the peroxide decomposition, or even stop the peroxide decomposition. Such compounds are, for example, acidic compounds (acids), basic compounds (bases), and additional amounts of catalyst. Acidic compounds lower the activity of the catalysts, and therefore decrease the velocity of the peroxide decomposition or even stop the peroxide decomposition, depending on the type and amount of acid used. Basic compounds increase the activity of the catalysts, and therefore increase the velocity of the peroxide decomposition. Likewise, adding additional catalyst increases the velocity of the peroxide decomposition.

In exemplary embodiments, the tuner compacts have a composition and structure which allows to liberate this compound, or several of these compounds, at a desired point of the peroxide decomposition reaction, thus allowing to increase the oxygen flow rate of a system having an intrinsically decreasing oxygen flow rate, or to decrease the oxygen flow rate of a system having an intrinsically increasing oxygen flow rate, resulting in a more constant flow rate of both systems. This tuning is achieved automatically during the peroxide decomposition reaction, without requiring any monitoring, let alone any regulatory intervention by an operator.

The structure is a core shell structure, i.e. a core is completely surrounded by a shell. This first (innermost) shell layer may be covered by a second shell layer which completely surrounds the first shell layer, the second shell layer may be covered by a third shell layer which completely surrounds the second shell layer, and so on. Thus, a layered structure results with the core constituting the innermost layer, and the outermost shell layer having an exposed surface.

In exemplary embodiments, at least one of the core and shell layers comprises at least one compound selected from a peroxide decomposition catalyst, an acidic compound and a basic compound.

In exemplary embodiments, each layer dissolves or decomposes or disintegrates in any other manner upon contact with the composition for generating oxygen. The outermost shell layer disintegrates first and liberates any compounds and additives contained therein. Once it has been removed, the next underlying shell layer is exposed and starts to disintegrate, and liberates any compounds and additives contained therein. Once it has been removed, the next underlying layer is exposed and liberates any compounds and additives contained therein, and so on, until finally the core layer is exposed and disintegrates and liberates any compounds and additives contained therein.

While theoretically the number of shell layers is not limited, exemplary tuner compacts have only one or two shell layers.

The composition of each tuner compact layer is adapted to decompose or dissolve or disintegrate in any other manner upon contact with the composition for generating oxygen.

In exemplary embodiments, a tuner compact layer (core or shell layer) consists of or comprises a peroxide compound. Upon contact with the composition for generating oxygen, the peroxide of the tuner compact layer gets involved in the oxygen production reaction and decomposes, thus liberating any compound and additive contained therein. If no catalyst, acidic compound or basic compound is contained therein, the time needed for decomposing the peroxide of the tuner compact layer constitutes a time span wherein the decomposition of the peroxide of the oxygen generating composition proceeds without influence of such compound.

In another exemplary embodiment, a tuner compact layer (core or shell layer) consists of or comprises an inactive (inert) compound which dissolves or swells upon contact with the composition for generating oxygen. "Inactive" or "inert" means that the compound does not exert any influence on the peroxide decomposition reaction. Dissolving the inactive compound removes the respective tuner compact layer. Insoluble, but in the ionic liquid swellable inactive compounds may be also used. Such compounds result in rupturing and finally disintegration of the respective tuner compact layer.

As an exemplary inactive compound sodium acetate, sodium chloride, sodium sulfate and sodium nitrate may be mentioned, which readily dissolve in ionic liquids.

Upon dissolution or disintegration, respectively, of the inactive tuner compact layer, any compound and additive contained therein is liberated. If no catalyst, acidic compound or basic compound is contained therein, the time needed for dissolving or disintegrating the respective tuner compact layer constitutes a time span wherein the decomposition of the peroxide of the oxygen generating composition proceeds without influence of such compound.

In further exemplary embodiments, a tuner compact layer may consist only of a peroxide decomposition catalyst, an acidic compound or a basic compound, provided that it is soluble or at least partially soluble in the composition for generating oxygen or in the ionic liquid of the composition for generating oxygen, respectively.

Examples for such compounds are soluble or partially soluble acids, soluble or partially soluble bases, and soluble or partially soluble metal salts as catalysts. Insoluble compounds (i.e. insoluble in the respective ionic liquid), such as metal oxide catalysts, can also be used, but are typically used in combination with soluble or partially soluble compounds. Otherwise, when a completely insoluble compound forms the outermost tuner compact layer at a time when the peroxide decomposition reaction stops, it cannot be restarted.

In exemplary embodiments, peroxide compounds suitable for use in the tuner compacts are the same as described above with reference to the composition for generating oxygen, and catalysts suitable for use in the tuner compacts are the same as described above with reference to the compositions for generating oxygen.

The acidic compounds according to exemplary embodiments are organic acids and acidic salts. Any organic acid or acidic salt which is solid under standard conditions may be used. Examples for organic acids are succinic acid, citric acid, and benzoic acid, and examples for acidic salts are sodium hydrogen sulfate and monopotassium phosphate.

Acidic compounds which dissolve upon contact with the composition for generating oxygen or the ionic liquid contained therein, respectively, may also act as a disintegrating agent for the respective tuner compact layer in which it is contained.

The basic compounds according to exemplary embodiments are hydroxides, basic salts, basic oxides and organic bases, which are solid under standard conditions. Exemplary bases are hydroxides such as sodium hydroxide, potassium hydroxide, and calcium hydroxide, basic salts such as potassium phosphate, sodium acetate, sodium percarbonate, potassium carbonate, and oxides such as calcium oxide.

Basic compounds which are soluble or at least partially soluble in the composition for generating oxygen or the ionic liquid contained therein, respectively, may act as disintegrating agents for the respective tuner compact layer in which they are contained.

In exemplary embodiments, the core and/or one or more of the shell layers comprises at least one auxiliary agent (additive) which does not influence the peroxide decomposition reaction. As auxiliary agents anti-foaming agents such as paraffin wax, and water absorbing substances such as silica may be mentioned.

Exemplary tuner compacts and tuner compact combinations are illustrated in FIGS. 1-5, and exemplary oxygen generating devices are illustrated in FIGS. 6-8.

An exemplary method for generating oxygen comprises providing an oxygen source, providing an ionic liquid (neutral or basic), providing a metal oxide compound and/or a metal salt, wherein the oxygen source is a peroxide compound, the ionic liquid is in the liquid state at least in the temperature range from $-10°$ C. to $+50°$ C., the metal oxide compound is an oxide of one single metal or of two or more different metals, said metal(s) being selected from the metals of groups 2 to 14 of the periodic table of the elements, the metal salt comprises one single metal or two or more different metals, and an organic and/or inorganic anion, and contacting the oxygen source, the ionic liquid, and the metal oxide compound and/or the metal salt.

According to an exemplary embodiment, the catalyst and the ionic liquid are provided as a first component, the oxygen source is provided as a second component, and the step of contacting comprises mixing the first component and the second component.

According to a further exemplary embodiment, the oxygen source and the catalyst are provided as a first component, the ionic liquid is provided as a second component, and the step of contacting comprises mixing the first component and the second component.

When the oxygen source and the catalyst are provided as one single component, i.e. in an admixed state, both the oxygen source and the catalyst should be thoroughly dried before mixing. Otherwise, the oxygen source will be decomposed inadvertently. In the absence of any mediator, for example water or an ionic liquid, the solid oxygen source and the solid catalyst constitute longterm stable mixtures.

If the ionic liquid is an acidic ionic liquid, an exemplary method for generating oxygen comprises providing an oxygen source, providing an acidic ionic liquid, providing a metal oxide compound and/or a metal salt, and providing a basic compound. The method is substantially as described above for neutral and basic ionic liquids, however, the step of generating oxygen is performed by contacting the oxygen source, the acidic ionic liquid, the peroxide decomposition catalyst and the basic compound.

In the above methods for generating oxygen, the oxygen is produced with a particular production rate and for a particular time. The production rate and time can be influenced to some extent by appropriately selecting the type and amounts of the constituents, the surface area of the peroxide compound, and by compressing the peroxide compound or a mixture of peroxide compound and catalyst into powder compacts. The higher the compaction pressure, the higher the degree of compaction of the resulting powder compact. High compaction pressures delay the onset of the reaction and extend the time period of oxygen generation. Nevertheless, each oxygen generation composition having a particular combination of constituents, and optionally a particular degree of compaction, produces oxygen at a rate inherent to that particular combination. There is no possibility to influence a running decomposition reaction.

The present invention provides the possibility to stop the peroxide decomposition reaction before the whole amount of oxygen is released. Alternatively, the oxygen production may be not stopped, but only decreased. Those effects can be achieved by adding an acidic compound, thus rendering the reaction mixture acidic. According to exemplary embodiments, the acidic compound is provided as a constituent of the core layer or of an inner shell layer of a tuner compact. After removal of the outer shell layer or the outer shell layers, the layer comprising the acidic compound gets exposed and liberates the acidic compound. The interruption or deceleration of the oxygen production can be observed instantaneously upon release of the acidic compound. By appropriately selecting the thickness and/or the compaction pressure of the outer layers of the tuner compact, the acidic compound is automatically released at a desired point of the decomposition reaction of the composition for generating oxygen.

The present invention also provides the possibility to increase the oxygen production rate of a running decomposition reaction. This effect can be achieved by adding a basic compound (rendering the reaction mixture basic) or an additional amount of catalyst to the composition for generating oxygen. According to exemplary embodiments, the basic compound or, alternatively, the additional amount of catalyst is provided as a constituent of the core layer or of an inner shell layer of a tuner compact. After removal of the outer shell layer or the outer shell layers the layer comprising the basic compound or the additional amount of catalyst gets exposed and liberates the basic compound or the additional amount of catalyst, respectively. By appropriately selecting the thickness of the outer shell layer(s) and/or the compaction pressure of the tuner compact, the basic compound or the additional amount of catalyst is automatically released at a desired point of the decomposition reaction of the composition for generating oxygen.

In exemplary embodiments of the invention, the oxygen generation by a composition for generating oxygen can be interrupted, and restarted again at a later time. Such an interruption and restart can be achieved by adding both an acidic compound (first) and a basic compound (later) to the composition for generating oxygen. The acidic compound is provided as a constituent of a core layer or of an inner shell layer of a first tuner compact (or of a plurality of first tuner compacts), and the basic compound is provided as a constituent of the core layer or of an inner shell layer of a second tuner compact (or a plurality of second tuner compacts). The outer shell layers of the first tuner compact and the second tuner compact have a composition and/or thickness and/or degree of compaction which renders sure that the layer comprising the basic compound is exposed later than the layer comprising the acidic compound. Thus, the acidic compound is liberated first, the reaction mixture is rendered acidic, and the oxygen production is interrupted, but at a later point in time the layer comprising the basic compound is exposed, liberating the basic compound. As a consequence, the reaction mixture is rendered basic, and, the oxygen generation sets in again.

Thus, according to exemplary embodiments, it is possible to adapt the oxygen production rate to the particular needs. It is even possible to completely stop the oxygen production, and to restart it again after a desired time interval.

In the context of this invention, a liquid or reaction mixture is regarded neutral, if its pH is in a range from 6.5 to 7.3. In ionic liquids having a pH from 6.5 to 7.3 (because they contain an ionic liquid having a pH in this range intrinsically, or because they contain an ionic liquid having a pH in a different range, but the pH has been adjusted by adding an acidic or a basic compound, respectively), the peroxide decomposition proceeds slowly, but complete.

In the context of this invention, a liquid or reaction mixture is regarded acidic, if its pH is in a range below 6.5. In ionic liquids having a pH below 6.5 (because they contain an ionic liquid having a pH below 6.5 intrinsically, or because they contain an ionic liquid having a different pH, but the pH has been adjusted by adding an acidic compound), the peroxide decomposition reaction proceeds slower than at a pH of 6.5 or above. The lower the pH value, the slower the decomposition reaction, and an increasingly higher amount of peroxide compound remains as an non-decomposed residue. The exact pH value where the peroxide decomposition does not proceed at all, depends on the types of ionic liquid, peroxide and catalyst, and can be easily found for each particular system by a few routine experiments.

In the context of this invention, a liquid or reaction mixture is regarded basic, if its pH is in a range above 7.3. In ionic liquids having a pH above 7.3 (because they contain an ionic liquid having a pH above 7.3 intrinsically, or because they contain an ionic liquid having a different pH, but the pH has been adjusted by adding a basic compound), the peroxide decomposition reaction proceeds faster than at a pH of 7.3 or below. The higher the pH value, the faster the peroxide is decomposed, i.e. the shorter the time period needed for complete decomposition of the peroxide. Again, reaction speeds somewhat vary depending on the types of ionic liquid, peroxide and decomposition catalyst, but a desired reaction speed for a particular system can be easily found by a few routine experiments.

Herein, the pH value of an ionic liquid or reaction mixture is determined in an 100 mM aqueous solution (distilled water) of the ionic liquid at 20° C. The pH value can be adjusted as desired by adding acids or bases, respectively, e.g. 1 M HCl or 1 M NaOH.

An exemplary method of tuning the oxygen production rate of an oxygen generator comprises providing an oxygen source, providing an ionic liquid (neutral or basic), providing a catalyst, and providing a tuner compact, generating oxygen by contacting the oxygen source, the ionic liquid and the catalyst, and modifying the oxygen production rate by contacting the tuner compact with the oxygen source, the ionic liquid and the catalyst. The tuner compact has a core shell structure comprising at least one compound selected from a peroxide decomposition catalyst, an acidic compound or a basic compound within the core and/or within one or more of the shell layers. Upon contact of the tuner compact with the composition for generating oxygen, the tuner compact breaks down in a process proceeding from the outside to the inside, thus liberating the compounds forming the shell layers and the core in a stepwise manner.

If the ionic liquid is an acidic liquid, a basic compound is provided in addition to the oxygen source, the acidic ionic liquid and the catalyst, and oxygen is generated by contacting the oxygen source, the acidic ionic liquid, the peroxide decomposition catalyst and the basic compound.

In the above tuning methods, the oxygen source, the ionic liquid, the catalyst, the basic compound and the constituents of the tuner compacts are as described above.

In an exemplary method, tuning the oxygen production rate consists in reducing the oxygen production rate or stopping the oxygen production by contacting a tuner compact comprising an acidic compound in a layer thereof with the oxygen source, the ionic liquid and the catalyst.

In another exemplary method, tuning the oxygen production rate consists in increasing the oxygen production rate by contacting a tuner compact comprising a basic compound and/or a catalyst in a layer thereof with the oxygen source, the ionic liquid and the catalyst.

In a further exemplary method, tuning the oxygen production rate consists in reducing the oxygen production or interrupting the oxygen production and, after a particular time interval, accelerating the oxygen production or restarting the oxygen production by contacting a tuner compact comprising an acidic compound in one layer thereof, and further comprising a basic compound in another layer thereof, wherein the layer comprising the basic compound is a relatively inner layer as compared to the layer comprising the acidic compound, with the oxygen source, the ionic liquid and the catalyst. The same effect is achieved by a combination of two tuner compacts, one comprising an acidic compound, and the other one comprising a basic compound, wherein the tuner compacts are structured in such a manner, that the basic compound is liberated at a desired time after liberation of the acidic compound.

According to further exemplary methods, acceleration and/or deceleration of the oxygen production is performed stepwise by contacting the oxygen source, the ionic liquid and the catalyst with tuner compacts having an acidic compound in several layers thereof, or having a basic compound or an additional amount of catalyst in several layers thereof. In exemplary embodiments, the layers comprising a compound with influences the peroxide decomposition reaction are separated by a layer which does not contain a compound which influences the peroxide decomposition reaction, or which does not contain the same compound which influences the peroxide decomposition reaction as the adjacent layers.

Including, in one and the same layer, compounds having opposite effects does not make sense. Therefore, tuner compacts having within the core layer or within one of the shell layers, a mixture comprising both an acidic compound and a basic compound, or a mixture comprising both an acidic compound and a catalyst, do not form part of this invention.

The present invention offers the possibility to influence running peroxide decomposition reactions in a desired predetermined manner which does not require any monitoring of the running decomposition reaction. Nevertheless, it is possible to influence the peroxide decomposition reaction, or to start the peroxide decomposition reaction in a different manner than by tuner compacts. For example, additional peroxide decomposition catalysts, basic compounds or acidic compounds may be introduced from the outside environment, whenever a user of an oxygen generator according to this invention deems it appropriate, for example because the amount of oxygen generated is regarded insufficient or abundant, or because a decomposition reaction which has been stopped shall be started again.

An exemplary device for generating oxygen in a tuned manner is specifically adapted for housing at least one tuner compact, and for housing the constituents of the composition for generating oxygen in a physically separated state, and for establishing physical contact of the oxygen source, the catalyst, the ionic liquid and the tuner compact once generation of oxygen is desired. If the ionic liquid is acidic, the composition for generating oxygen also comprises a basic compound for starting the decomposition reaction. In this case, the oxygen source, the catalyst, and the ionic liquid do not need to be housed in a physically separated state, however, the basic compound must be physically separated from the ionic liquid. In such a case, an exemplary device for generating oxygen is adapted for establishing physical contact of the oxygen source, the catalyst, the tuner compact, the acidic ionic liquid and the basic compound. Further, if the outermost shell layer of the tuner compact is soluble or partially soluble in the ionic liquid, the device must be adapted for maintaining the tuner compact physically separated from the ionic liquid, and for establishing physical contact of the tuner compact and the constituents of the composition for generating oxygen.

Devices for housing the constituents of the composition for generating oxygen in a physically separated state and for bringing them into physical contact once generation of oxygen is desired, are described in US patent application publication US 2018/0141810 A1 and its counterpart European published patent application EP 3 323 782 A1, in particular in paragraphs [0053] to [0057], and [0105] to [0136] and are illustrated in FIGS. 18 to 22 of EP 3 323 782 A1. The respective disclosure is incorporated herein by reference thereto. The devices are suitable for performing a method according to the present invention, and exemplary modifications of the devices are illustrated herein in FIGS. 7 and 8, and are described herein with reference to FIGS. 7 and 8.

In exemplary embodiments the ionic liquids described above are used as dispersants or solvents and as heat sinks in the oxygen generator described above.

The disclosed generators, methods and devices may take advantage of any of the materials described above in relation to compositions and vice versa.

All references herein to "comprising" should be understood to encompass "including" and "containing," as well as "consisting of" and "consisting essentially of."

The term "a" means "one or more" or "at least one".

Other features which are considered as characteristic for the invention are set forth in the appended claims.

Although the invention is illustrated and described herein as embodied in an oxygen generator and a method for tuning the oxygen production rate of an oxygen generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

In FIGS. 9 to 16, oxygen flow rate and volume, respectively, are plotted against runtime, wherein runtime is the time which starts running at the time point of contacting the oxygen source, the ionic liquid, the catalyst and the tuner compact(s). "Volume" is the oxygen volume released in total.

DETAILED DESCRIPTION OF THE INVENTION

Figure 1:
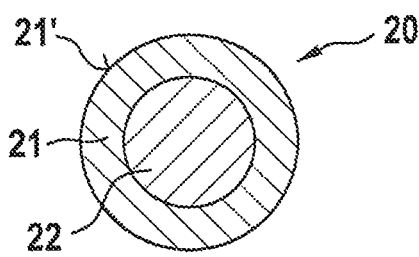
FIGS. 1-5 are sectional views schematically illustrating exemplary embodiments of tuner compacts according to the invention.

Referring now to the figures of the drawing in detail and first, particularly, to FIG. 1 thereof, there is shown a tuner compact 20 comprising two layers, a core layer 22 and one shell layer 21. Shell layer 21 has an exposed surface 21'. In the exemplary embodiment of FIG. 1, shell layer 21 consists of a solid peroxide, and core layer 22 consists of a solid acid. When contacted with a mixed composition for generating oxygen, the peroxide of shell layer 21 starts to decompose at surface 21', and the decomposition proceeds until core layer 22 is reached. At this specific moment, the acid of core layer 22 is liberated, and the decomposition reaction is stopped or decelerated, depending on the amount of acid released.

Figure 2:
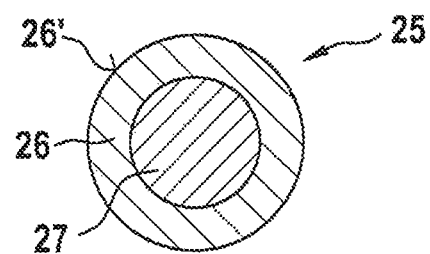

FIG. 2 illustrates a tuner compact 25 comprising two layers, a core layer 27 and one shell layer 26. Shell layer 26 has an exposed surface 26'. In the exemplary embodiment of FIG. 2, shell layer 26 consists of an inactive salt, i.e. a salt which does not influence the peroxide decomposition reaction, which is soluble in the ionic liquid of the composition for generating oxygen. Core layer 27 consists of a catalyst.

When contacted with a mixed composition for generating oxygen, the soluble salt of shell layer 26 starts to dissolve at surface 26', and the dissolution proceeds until core layer 27 is reached. At this specific moment, the catalyst contained in core layer 27 is liberated, and the decomposition reaction is accelerated.

Figure 3:
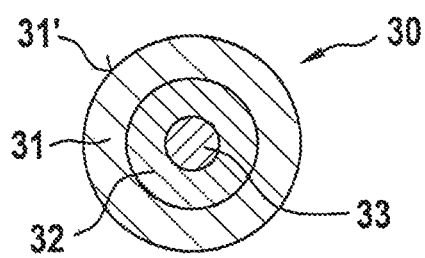

FIG. 3 illustrates a tuner compact 30 comprising three layers, a core layer 33, a first (inner) shell layer 32, and a second (outer) shell layer 31. Shell layer 31 has an exposed surface 31'. In the exemplary embodiment of FIG. 3, second shell layer 31 consists of a solid peroxide, first shell layer 32 consists of a mixture of a solid acid and a solid peroxide, and core layer 33 consists of a solid base.

When contacted with a mixed composition for generating oxygen, the peroxide of second shell layer 31 starts to decompose at surface 31', and the decomposition proceeds until the first shell layer 32 is reached. At this specific moment, the acid contained therein is liberated, and the decomposition reaction is decelerated, and finally stopped after release of sufficient acid. While the decomposition of first shell layer 32 proceeds due to leaching out of the acid, additional peroxide is liberated, thus increasing the amount of peroxide available for decomposition. Upon complete removal of first shell layer 32, core layer 33 is exposed. At this specific moment, the basic compound contained in core layer 33 is liberated, and the peroxide decomposition reaction is restarted. The decomposition reaction speeds up with increasing basicity of the reaction mixture.

Figure 4:
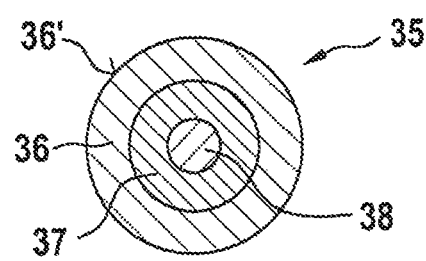

FIG. 4 illustrates a tuner compact 35 comprising three layers, a core layer 38, a first shell layer 37, and a second shell layer 36. Second shell layer 36 has an exposed surface 36'. In the exemplary embodiment of FIG. 4, core layer 38 consists of a mixture of a basic compound and a peroxide, first shell layer 37 consists of a solid acid, and second shell layer 36 consists of a mixture of a catalyst and a peroxide.

When contacted with a mixed composition for generating oxygen, the peroxide of second shell layer 36 starts to decompose at surface 36', and the decomposition proceeds until first shell layer 37 is reached. Decomposition of second shell layer 36 liberates additional catalyst for accelerating the peroxide decomposition reaction. When the second shell layer 36 has been completely removed, the acid of first shell layer 37 is liberated, and the decomposition reaction is decelerated, and finally stopped. Once all acid of first shell layer 37 has been dissolved, core 38 is exposed to the composition for generating oxygen, and the basic compound contained therein is liberated, thus restarting the oxygen production reaction again, once a sufficiently basic pH has been reached. Core 38 provides additional peroxide for decomposition in the oxygen production reaction.

Figure 5:
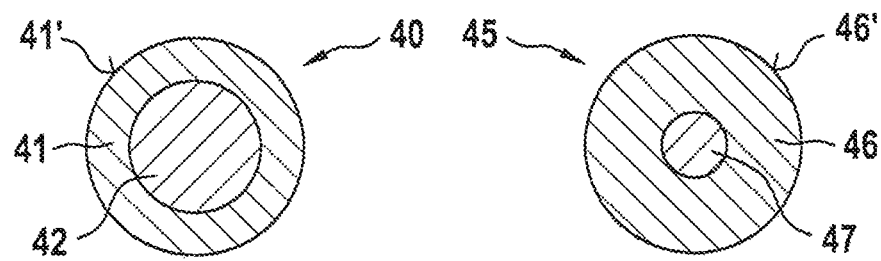

FIG. 5 illustrates a tuner compact combination comprising a first tuner compact 40 and a second tuner compact 45. First tuner compact 40 comprises two layers, a core layer 42 and one shell layer 41. Shell layer 41 has an exposed surface 41'. Second tuner compact 45 also comprises two layers, a core layer 47 and one shell layer 46. Shell layer 46 has an exposed surface 46'.

In the exemplary embodiment of FIG. 5, shell layer 41 consists of a mixture of a peroxide and a catalyst, and core layer 42 consists of an acid. Shell layer 46 also consists of a mixture of a peroxide and a soluble catalyst, and core layer 47 consists of a basic compound.

Shell layers 41 and 46 have an identical composition, but vary considerably in thickness, i.e. shell layer 46 is about three times as thick as shell layer 41. Therefore, when tuner compacts 40, 45 are contacted with a mixed composition for generating oxygen, both shell layers 41, 46 start to decompose at the same time, but shell layer 41 is removed much faster than shell layer 46. Once shell layer 41 has been removed, the acid of core layer 42 is liberated, and the oxygen production reaction is decelerated and finally stopped. However, shell layer 46 is still in contact with the ionic liquid, and the catalyst contained therein slowly dissolves, thus finally removing shell layer 46, and exposing core layer 47. When core layer 47 gets exposed, the basic compound contained therein is liberated, and the oxygen production reaction starts again.

While FIGS. 1-5 show substantially spherical tuner compacts, it is stressed that the shapes of the tuner compacts are not limited in any manner. Shapes such as ellipsoids or rods, for example, are also contemplated.

In the following, exemplary device for generating oxygen are described, assuming that the ionic liquid contained therein is a neutral or basic ionic liquid.

Figure 6:
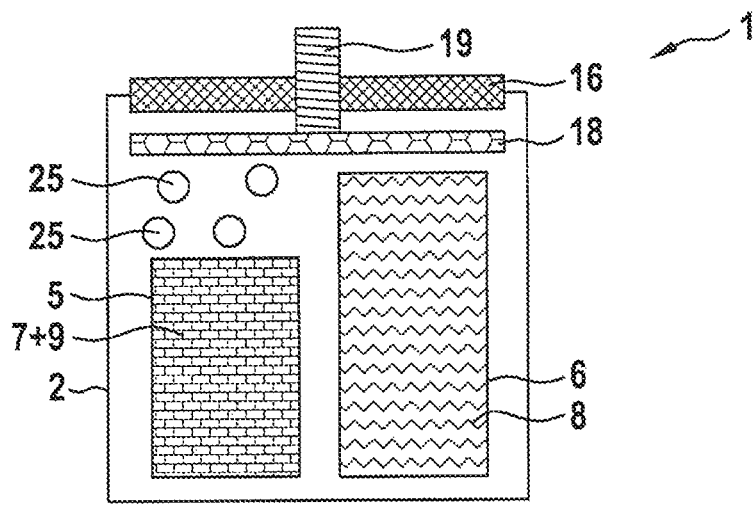
FIGS. 6-8 are sectional views schematically illustrating exemplary embodiments of devices for generating oxygen in a tuned manner according to the invention.

FIG. 6 illustrates an exemplary device 1 for generating oxygen in a tuned manner, the device having one single reaction chamber 2 for storing the composition for generating oxygen and tuner compacts 25. In such a single reaction chamber 2 at least one of the constituents of the composition for generating oxygen must be enclosed in a receptacle in order to avoid contact with the remaining constituents of the composition contained in the reaction chamber. In addition, the tuner compacts must be maintained separated from the ionic liquid, if their outermost shell layers are soluble or partly soluble therein. In the embodiment shown in FIG. 6, two receptacles 5, 6 are arranged in the reaction chamber. Receptacle 5 contains an intimate mixture of the oxygen source 7 and the decomposition catalyst 9, for example in powder form or compressed into pellets, in a thoroughly dried condition. Receptacle 6 contains the neutral or basic ionic liquid 8. Tuner compacts 25 are not contained in any receptacle. Tuner compacts 25 have a structure and composition as described above with reference to FIG. 2. In an alternative exemplary embodiment, catalyst 9 may be dispersed or dissolved in ionic liquid 8, rather than being mixed with peroxide 7.

In a situation where oxygen shall be generated, receptacles 5 and 6, respectively, are destroyed by a breaking device 18. In FIG. 6, breaking device 18 has the form of a plate, however, means for destroying the receptacles are not limited to plates, and other means are known to persons skilled in the art, for example firing pins or grids. Movement of plate 18 can be achieved by a spring 19 or another activation mechanism. During storage of the device for generating oxygen, spring 19 is under tension and holds plate 18 at a position distant from receptacles 5, 6. Once the tension is released by a suitable trigger mechanism (not shown), spring 19 moves plate 18 towards receptacles 5, 6, and plate 18 destroys receptacles 5, 6. Such a trigger may be, for example, pulling an oxygen mask towards a passenger in an airplane. Another exemplary trigger mechanism is an oxygen sensor sensing a low oxygen condition.

Receptacles 5, 6, and plate 18 are made from materials which guarantee that receptacles 5, 6 will be broken or ruptured when hit by plate 18. Exemplary materials are plastic foils or glass for receptacles 5,6, and thicker plastic material or metal for plate 18.

Destruction of receptacles 5, 6 causes mixing of peroxide, ionic liquid, and catalyst, and initiates oxygen generation. It also initiates dissolution of shell layer 26 of tuner compacts 25. The velocity of the peroxide decomposition reaction tends to decrease with increasing runtime, but this phenomenon is counteracted by the release of additional catalyst from core layer 27 of tuner compact 25 after complete dissolution of shell layer 26. The oxygen produced exits reaction chamber 2 through an opening provided therein. In the illustrated embodiment, the opening is sealed with a gas permeable membrane 16. The opening may be at a different position than shown in FIG. 6, or there may be more than one opening.

In exemplary embodiments, the oxygen generated in the device described herein may be passed through a filter or other purification means as known in the art. The device may be equipped with such means.

The oxygen generating reaction is an only slightly exothermic process, and proceeds at low temperature, i.e. below 150° C., or even below 120° C. or below 100° C. Therefore, reaction chamber 2 does not need to resist high temperatures, and may be made from lightweight, low melting materials such as plastic. In addition, any bulky insulation is not required. This is particularly advantageous in all cases where weight must be saved and/or space is limited, for example in the case of oxygen masks which shall be installed in an aircraft.

Figure 7:
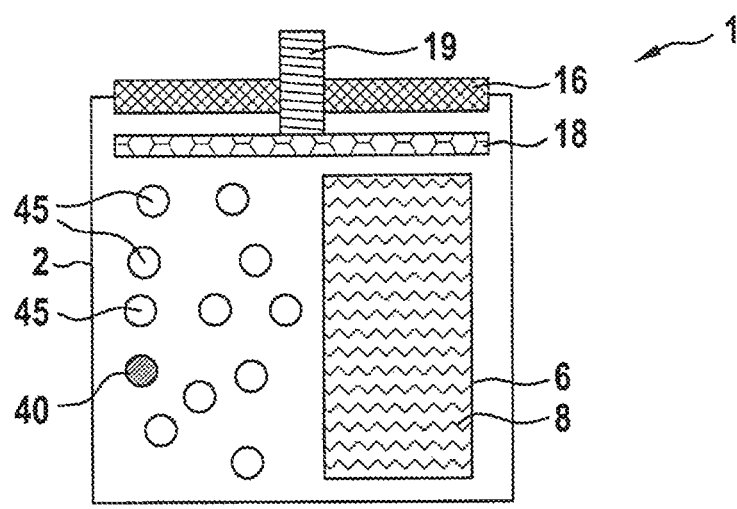

FIG. 7 illustrates a further exemplary device 1 for generating oxygen in a tuned manner. The device is similar to the device illustrated in FIG. 6, but lacks receptacle 5. Therefore, the oxygen source and the catalyst are contained "free" in reaction chamber 2. In this exemplary embodiment, both the oxygen source and the catalyst of the composition for generating oxygen are provided as constituents of tuner compacts. In the embodiment illustrated in FIG. 7, a combination of a first tuner compact 40 and a second tuner compact 45 as described with reference to FIG. 5 are used. There is a multitude of second tuner compacts 45 (unfilled circles) which provide a large amount of an oxygen source in combination with the required decomposition catalyst within the shell layer 46, and only one single first tuner compact 40 (filled circle).

Destruction of receptacle 6 causes mixing of the first tuner compact 40, the second tuner compact 45 and the neutral or basic ionic liquid 8, and initiates oxygen generation by decomposing the peroxides contained in shell layers 41 and 46. After decomposition of the peroxide of shell layer 41, the oxygen generation is stopped by the acid of core layer 42, provided that sufficient acid has been released to make the reaction mixture acidic. However, dissolution of the catalysts contained in shell layer 46 in the ionic liquid continues and leads to disintegration of shell layer 46. After removal of shell layer 46, the basic compound constituting core layer 47 is exposed and restarts the peroxide decomposition reaction.

Figure 8:
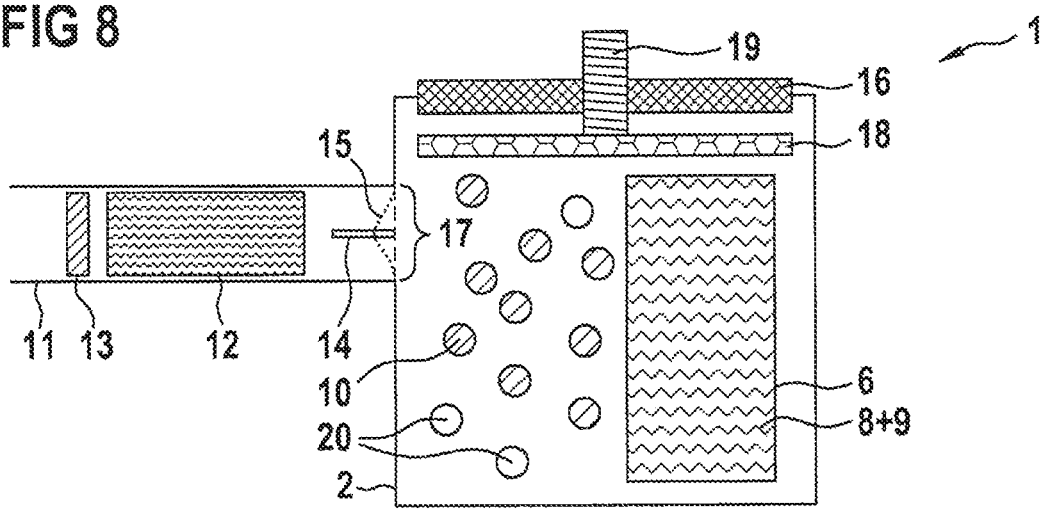

An additional exemplary device for generating oxygen in a tuned manner is illustrated in FIG. 8. The device 1 illustrated in FIG. 8 is similar to the device illustrated in FIG. 7, but is equipped with an injection device 11. Opening 17 fluidly connects the interior spaces of reaction chamber 2 and of injection device 11.

The injection device 11 comprises a receptacle 12, a slide bar 13 and a spike 14. Spike 14 is held in place by fixture 15. Receptacle 12 is made from a material which can be easily ruptured, for example a bag made from a plastic foil. Receptacle 12 contains a basic compound.

In the exemplary embodiment illustrated in FIG. 8, slide bar 13 can be actuated in an analogous manner as the braking device 18. Once actuated, slide bar 13 pushes receptacle 12 towards spike 14, receptacle 12 is ruptured, and the basic compound is injected through opening 17 into reaction chamber 2.

Reaction chamber 2 contains receptacle 6 holding a solution of catalyst 9 in neutral or basic ionic liquid 8. Powder compacts 10 consisting of a peroxide compound (hatched circles) and tuner compacts 20 (unfilled circles) as described with reference to FIG. 1 are contained "free" within reaction chamber 2.

Actuation of breaking device 18 starts the peroxide decomposition reaction in reaction chamber 2. Both the peroxide of powder compacts 10 and the peroxide contained within shell layer 21 of tuner compacts 20 are decomposed, producing oxygen until the peroxide of shell layer 21 has been used up. Oxygen generation stops when the acidic compound of core layer 22 is exposed. Due to a lack of a basic compound in the oxygen generator, which gets exposed at a later point of time, oxygen generation will not restart. However, oxygen generation can be restarted at an arbitrary point of time by actuating slide bar 13 of injection device 11. Actuation of slide bar 13 causes injection of the basic compound contained in receptacle 12 into reaction chamber 2, which again causes restart of the oxygen generation which continues until all peroxide compound contained in powder compacts 10 has been decomposed.

The devices illustrated in FIGS. 6 to 8 can be modified for use with acidic ionic liquids. Provided that the tuner compacts have outer shell layers which are insoluble in the ionic liquid, receptacles 6 and breaking devices 18, 19 can be omitted, and the devices can be equipped with (further) injection devices 11 containing basic compounds for starting the decomposition reaction. If the outer shell layers are at least partially soluble in the respective ionic liquids, contact of tuner compacts and ionic liquids must be prevented, e.g. by enclosing the ionic liquids in receptacles 6.

In all graphs illustrating oxygen release, oxygen volume released and oxygen flow rate, respectively, are plotted against runtime, wherein runtime is the time which starts running at the time point of contacting the oxygen source, the ionic liquid, the catalyst, and the powder compact. "Volume" is the oxygen volume released in total. Oxygen flow rate (l/h) and oxygen volume released (l) by each decomposition reaction were measured with a drum gas meter in each of the experiments of examples 1-4, throughout the experiments.

Example 1

Example 1 comprises experiments 1-3. In each experiment, urea hydrogen peroxide (UHP; in the form of tablets weighing 1 g each) was charged into a glass flask. A solution of $Mn(OAc)_2*4H_2O$ (0.15 mol % in terms of $H_2O_2$ contained in UHP) in [EMIM][OAc] was added thereto.

Furthermore, in each experiment, powder compacts (compact diameter: 32 mm, compaction pressure: 70 to 80 MPa) were added into the glass flask before start of the decomposition reaction. In each experiment, the flask was closed, and the oxygen flow rate and the oxygen volume released in total from the composition were measured with a drum gas meter.

In experiment 2, one powder (tuner) compact having a core shell structure as shown in FIG. 2 was used. The tuner compact had a core (diameter: 20 mm) consisting of 1 g $Mn(OAc)_2*4H_2O$ and a shell consisting of 5 g NaOAc.

In experiment 3, two of the same tuner compacts as in experiment 2 were added into the flask.

In experiment 1, one powder (comparison) compact consisting of 5 g NaOAc was added into the flask.

The respective amounts of the compounds used in the experiments, the oxygen volume released in total, and the reaction time until complete decomposition of the oxygen source are indicated in table 1.

TABLE 1

| Experiment No. | catalyst (mass) | peroxide adduct (mass) | ionic liquid (mass) | Type and Mass of powder compacts | oxygen volume released | time until complete peroxide decomposition |
|---|---|---|---|---|---|---|
| 1 | $Mn(OAc)_2 \cdot 4H_2O$ (165.5 mg) | UHP (60 g) | [EMIM][OAc] (20 g) | 5 g NaOAc | 8700 ml | 17.0 min |
| 2 | $Mn(OAc)_2 \cdot 4H_2O$ (165.5 mg) | UHP (60 g) | [EMIM][OAc] (20 g) | 1 g $Mn(OAc)_2*4H_2O$ in 5 g NaOAc | 9240 ml | 12.9 min |
| 3 | $Mn(OAc)_2 \cdot 4H_2O$ (165.5 mg) | UHP (60 g) | [EMIM][OAc] (20 g) | 2*(1 g $Mn(OAc)_2*4H_2O$ in 5 g NaOAc) | 9345 ml | 11.9 min |

Figure 9:
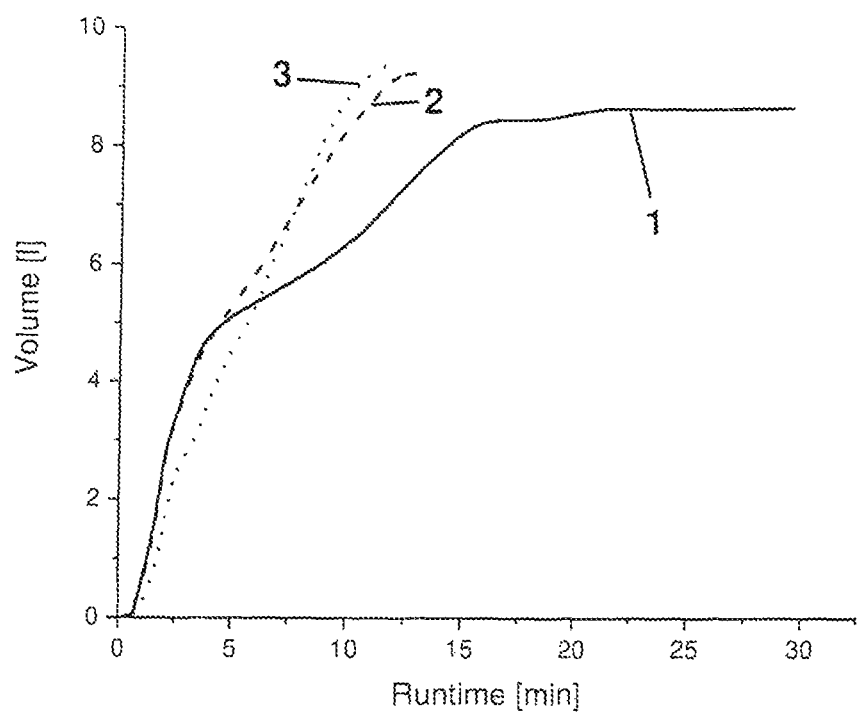
FIGS. 9 and 10 are graphs illustrating oxygen release from UHP through $Mn(OAc)_2 \cdot 4H_2O$ in [EMIM][OAc], influenced by tuner compacts providing different amounts of manganese acetate as an additional catalyst.
Figure 10:
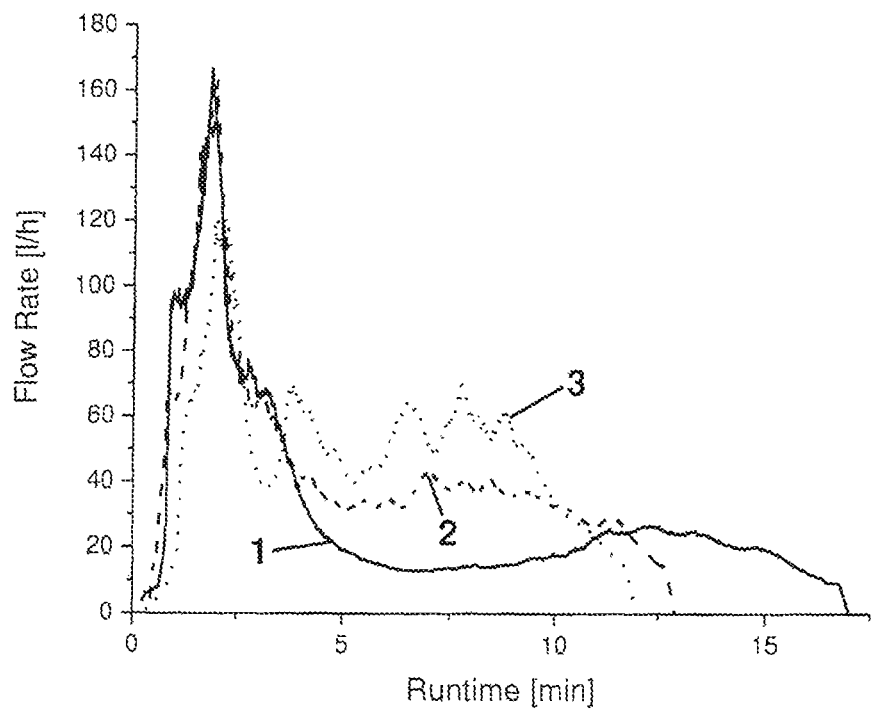

The results are illustrated in FIG. 9 (oxygen volume released) and FIG. 10 (oxygen flow rate). In the figures, line 1 indicates the oxygen volume released/the oxygen flow rate in experiment 1, line 2 indicates the oxygen volume released/the oxygen flow rate in experiment 2, and line 3 indicates the oxygen volume released/the oxygen flow rate in experiment 3.

Example 1 proves that in experiments 2 and 3 the decomposition of the oxygen source is accelerated after a certain runtime, as compared to experiment 1. This effect can be attributed to the liberation of additional catalyst (manganese acetate) from the tuner compacts after dissolution of the inactive sodium acetate shell surrounding the catalyst core.

Example 2

Example 2 comprises experiments 1 and 2. In each experiment, UHP (in the form of tablets weighing 1 g each) was charged into a glass flask. A solution of $Mn(OAc)_2*4H_2O$ (0.17 mol % in terms of $H_2O_2$ contained in UHP) in [EMIM][OAc] was added thereto.

Furthermore, in each experiment, powder compacts (compact diameter: 32 mm, compaction pressure: 70 to 80 MPa) were added into the glass flask. In each experiment, the flask was closed, and the oxygen flow rate and the oxygen volume released in total from the compositions were measured with a drum gas meter.

In experiment 2, two powder (tuner) compacts having a core shell structure as shown in FIG. 1 were added to the UHP before start of the decomposition reaction. Each tuner compact had a core (diameter 20 mm) consisting of 5 g succinic acid, and a shell consisting of UHP. Furthermore, one powder compact consisting of UHP was added to the UHP in the glass flask before start of the decomposition reaction.

In experiment 1, three powder (comparison) compacts consisting of 10 g UHP were added into the flask.

The respective amounts of the compounds used in the experiments, the oxygen volume released in total, and the time period of oxygen production due to decomposition of the oxygen source are indicated in table 2.

TABLE 2

| Experiment No. | catalyst (mass) | peroxide adduct (mass) | ionic liquid (mass) | type and mass of powder compacts | oxygen volume released | Time until end of peroxide decomposition |
|---|---|---|---|---|---|---|
| 1 | Mn(OAc)$_2$•4H$_2$O (183.9 mg) | UHP (60 g) | [EMIM][OAc] (20 g) | 3*10 g UHP | 8565 ml | 14.5 min |
| 2 | Mn(OAc)$_2$ 4H$_2$O (183.9 mg) | UHP (60 g) | [EMIM][OAc] (20 g) | 1*10 g UHP 2*(5 g succinic acid in 10 g UHP) | 4615 ml | 8.2 min |

Figure 11:
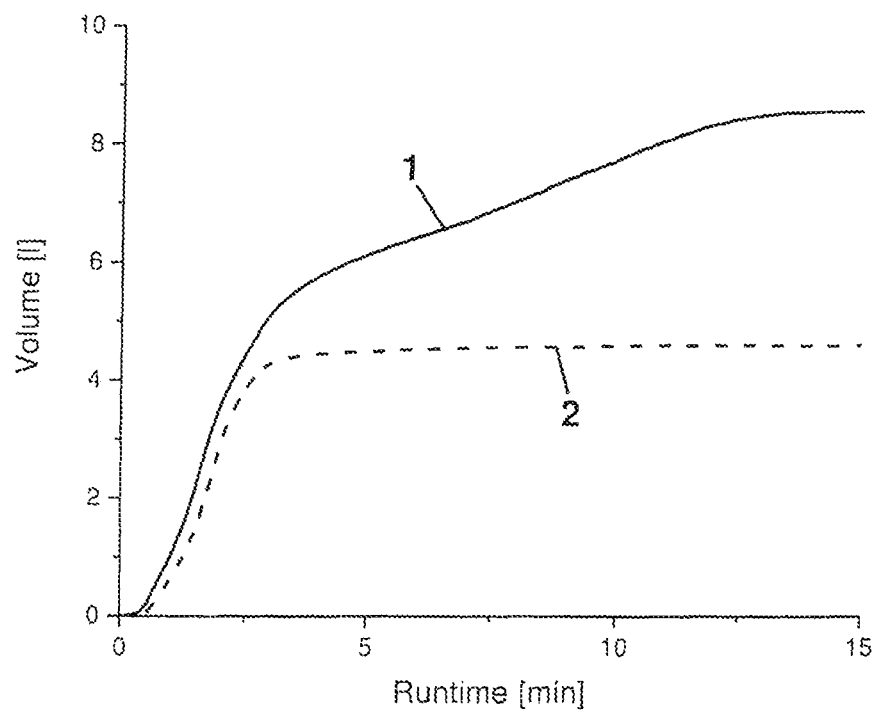
FIGS. 11 and 12 are graphs illustrating oxygen release from UHP through $Mn(OAc)_2 \cdot 4H_2O$ in [EMIM][OAc], influenced by tuner compacts having a succinic acid core.
Figure 12:
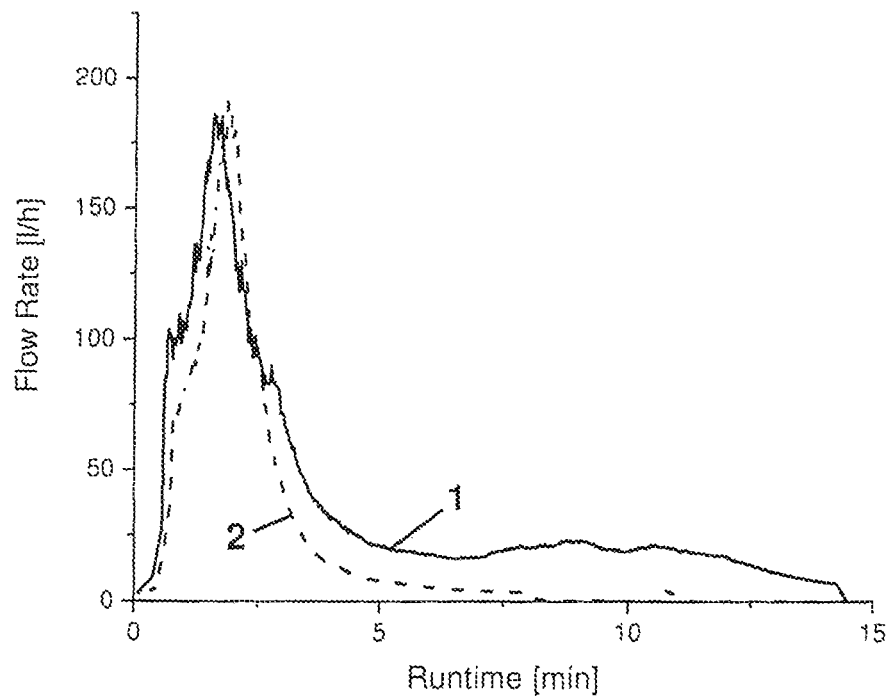

The results are illustrated in FIG. 11 (oxygen volume released) and FIG. 12 (oxygen flow rate). In the figures, line 1 indicates the oxygen volume released/the oxygen flow rate in experiment 1, and line 2 indicates the oxygen volume released/the oxygen flow rate in experiment 2.

Example 2 proves that in experiment 2 the decomposition of the oxygen source is terminated after a certain runtime, while in experiment 1 the decomposition of the oxygen source still proceeds. This effect can be attributed to the liberation of succinic acid from the tuner compact after decomposition of the UHP shell surrounding the succinic acid core. The liberation of succinic acid results in an incomplete decomposition of the oxygen source, i.e. there remains undecomposed UHP in the glass flask.

Example 3

Example 3 comprises experiments 1 and 2. In each experiment, UHP (in the form of tablets weighing 1 g each) was charged into a glass flask. Furthermore, in each experiment, powder compacts (compact diameter: 32 mm, compaction pressure: 70 to 80 MPa) were charged into the glass flask. A dispersion of MnO$_2$ (3 mol % in terms of H$_2$O$_2$ contained in UHP) in [MMIM][PO$_4$Me$_2$] was added thereto. Then, in each experiment, the flask was closed, and the oxygen flow rate and the oxygen volume released in total from the composition were measured with a drum gas meter.

In experiment 2, one powder (tuner) compact having a core shell structure as shown in FIG. 2 was used. The tuner compact had a core (diameter: 20 mm) consisting of 1 g Mn(OAc)$_2$*4H$_2$O and a shell consisting of 5 g NaOAc.

In experiment 1, one powder (comparison) compact consisting of 5 g NaOAc was used.

The respective amounts of the compounds used in the experiments, the oxygen volume released in total, and were reaction time until complete decomposition of the oxygen source are indicated in table 3.

Figure 13:
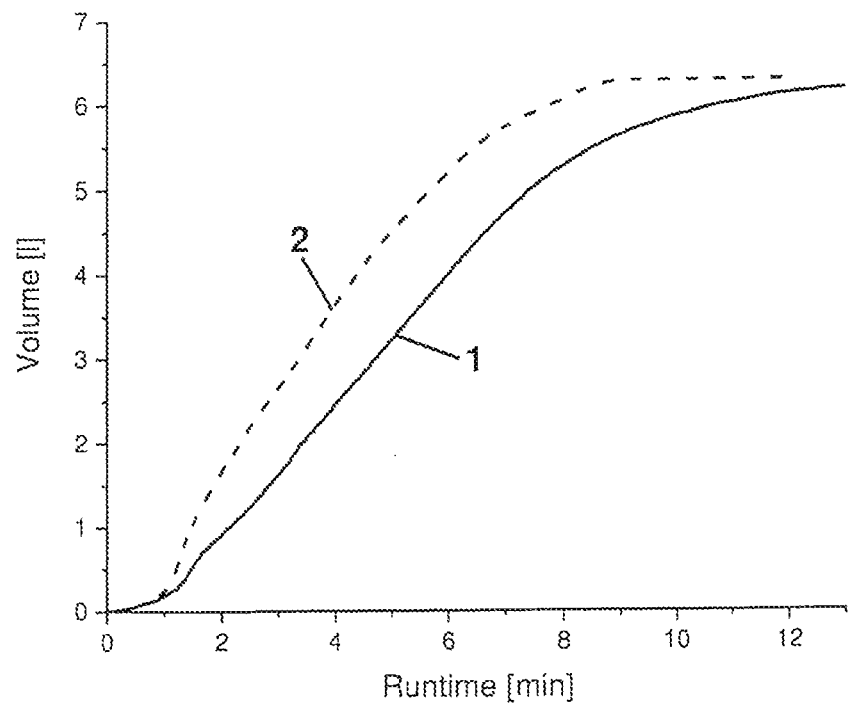
FIGS. 13 and 14 are graphs illustrating oxygen release from UHP through $MnO_2$ in [MMIM][$PO_4Me_2$], influenced by tuner compacts providing $Mn(OAc)_2 \cdot 4H_2O$ as an additional catalyst.
Figure 14:
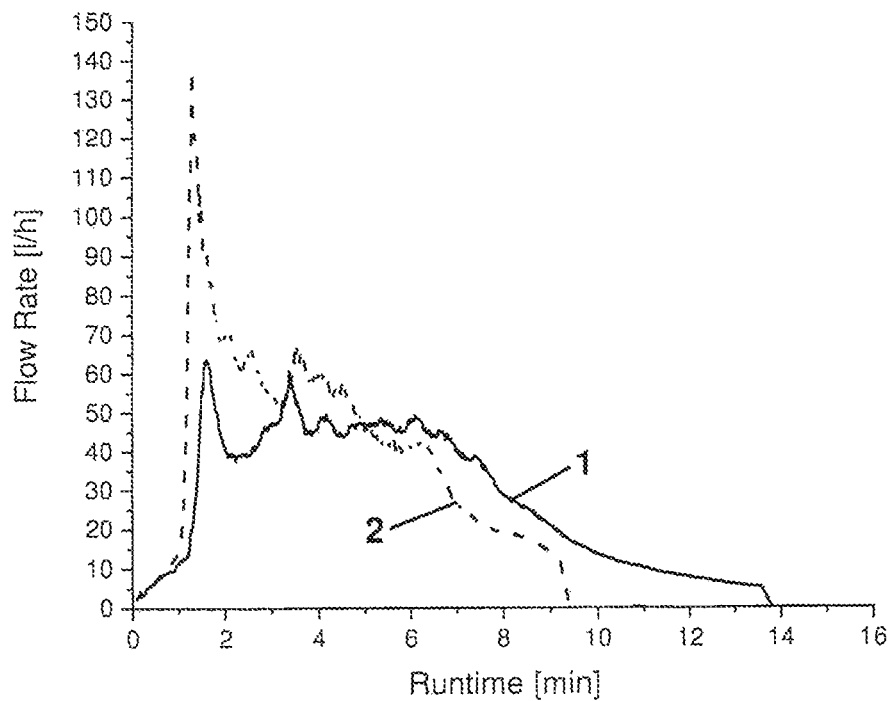

The results are illustrated in FIG. 13 (oxygen volume released) and FIG. 14 (oxygen flow rate). In the figure, line 1 indicates the oxygen volume released/the oxygen flow rate in experiment 1, and line 2 indicates the oxygen volume released/the oxygen flow rate in experiment 2.

Example 3 proves that in experiment 2 the decomposition of the oxygen source is accelerated after a certain runtime, as compared to experiment 1. This effect can be attributed to the liberation of additional catalyst (manganese acetate) from the tuner compacts after dissolution of the inactive sodium acetate shell surrounding the catalyst core.

Example 4

Example 4 comprises experiments 1 to 4. In each experiment, UHP (in the form of tablets weighing 1 g each) was charged into a glass flask. In addition, in each experiment powder compacts (compact diameter: 32 mm, compaction pressure: 70 to 80 MPa) were charged into the glass flask. A solution of Mn(OAc)$_2$*4H$_2$O (0.15 mol % in terms of H$_2$O$_2$ contained in UHP) in [EMIM][OAc] was added thereto. Then, in each experiment, the flask was closed, and the oxygen flow rate and the oxygen volume released from the decomposition were measured with a drum gas meter.

In experiment 2, four powder compacts were used, two tuner compacts and two comparison compacts. The tuner compacts had a core shell structure similar to the structure shown in FIG. 2, but with a basic compound as the core. The core diameter was 20 mm, the core material was sodium carbonate (2 g) and the shell material was sodium acetate (5 g). The comparison compacts were made from 5 g sodium acetate each.

In experiment 3, four tuner compacts having a core shell structure similar to the structure shown in FIG. 2 were used. The tuner compacts were the same as in experiment 2, i.e. the core material was 2 g sodium carbonate, and the shell material was 5 g sodium acetate.

In experiment 1, four powder (comparison) compacts consisting of 5 g NaOAc were used.

The respective amounts of the compounds used in the experiments and the oxygen volume released in total after a runtime of 35 minutes are indicated in table 4.

TABLE 3

| experiment No. | catalyst (mass) | peroxide adduct (mass) | ionic liquid (mass) | type and mass of powder compacts | oxygen volume released | time until complete peroxide decomposition |
|---|---|---|---|---|---|---|
| 1 | MnO$_2$ (1108.8 mg) | UHP (40 g) | [MMIM][PO$_4$Me$_2$] (25 g) | 5 g NaOAc | 6175 ml | 13.8 min |
| 2 | MnO$_2$ (1108.8 mg) | UHP (40 g) | [MMIM][PO$_4$Me$_2$] (25 g) | 1 g Mn(OAc)$_2$*4H$_2$O in 5 g NaOAc | 6280 ml | 9.4 min |

TABLE 4

| Experiment No. | catalyst (mass) | peroxide adduct (mass) | ionic liquid (mass) | type and mass of powder compacts | oxygen volume after 35 min | run time |
|---|---|---|---|---|---|---|
| 1 | Mn(OAc)$_2$•4H$_2$O (165.5 mg) | UHP (60 g) | [EMIM][OAc] (20 g) | 4*(5 g NaOAc) | 4110 ml | 35 min |
| 2 | Mn(OAc)$_2$•4H$_2$O (165.5 mg) | UHP (60 g) | [EMIM][OAc] (20 g) | 2*(5 g NaOAc) 2*(2 g Na$_2$CO$_3$ in 5 g NaOAc) | 4720 ml | 35 min |
| 3 | Mn(OAc)$_2$•4H$_2$O (165.5 mg) | UHP (60 g) | [EMIM][OAc] (20 g) | 4*(2 g Na$_2$CO$_3$ in 5 g NaOAc) | 6275 ml | 35 min |

Figure 15:
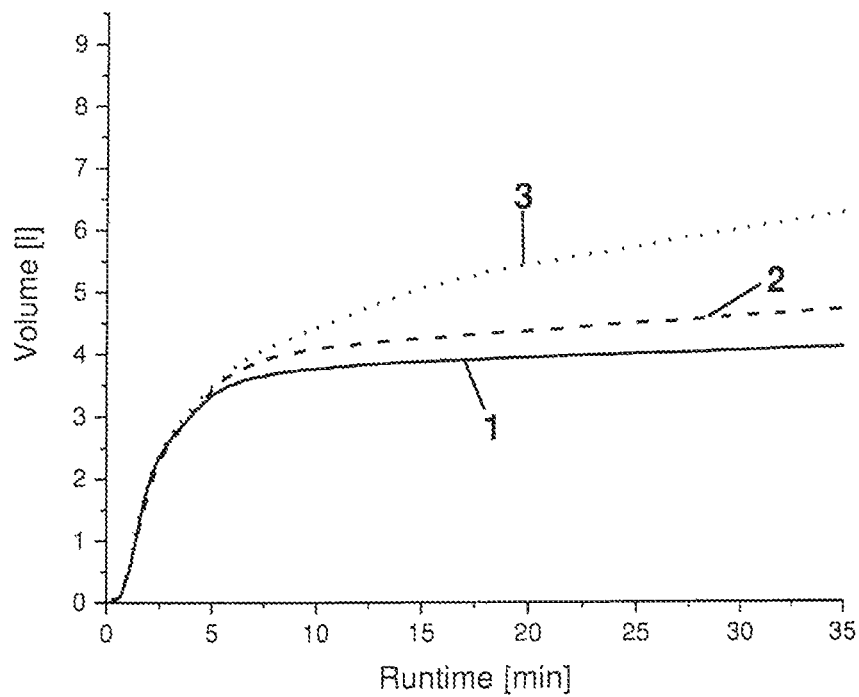
FIGS. 15 and 16 are graphs illustrating oxygen release from UHP through $Mn(OAc)_2 \cdot 4H_2O$ in [EMIM][OAc], influenced by tuner compacts providing different amounts of sodium carbonate.
Figure 16:
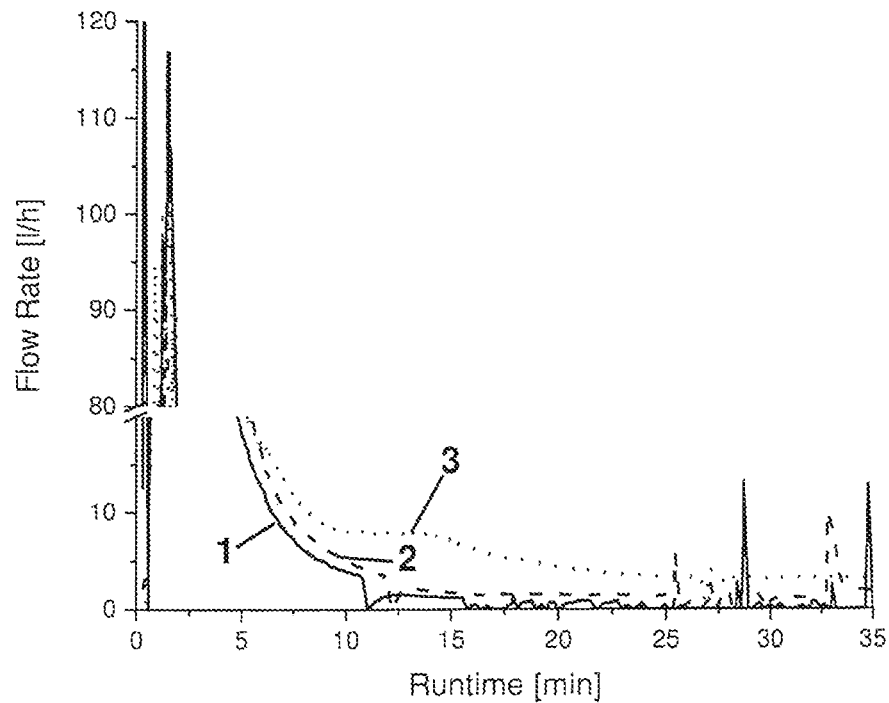

The results are illustrated in FIG. 15 (oxygen volume released) and FIG. 16 (oxygen flow rate). In the figures, line 1 indicates the oxygen volume released/the oxygen flow rate in experiment 1, line 2 indicates the oxygen volume released/the oxygen flow rate in experiment 2 and line 3 indicates the oxygen volume released/the oxygen flow rate in experiment 3.

Example 4 proves that in experiments 2 and 3 the decomposition of the oxygen source is accelerated after a certain runtime, as compared to experiment 1. This effect can be attributed to the liberation of the base sodium carbonate from the tuner compact after dissolution of the inactive sodium acetate shell surrounding the sodium carbonate core. In experiment 3, the acceleration is more pronounced than in experiment 2, because more sodium carbonate base was liberated in experiment 3.

The oxygen produced according to this invention is pure and at a low temperature. Furthermore, due to the possibility of a controlled release of compounds which are able to accelerate or to decelerate the decomposition reaction, the oxygen can be provided with a considerably more constant flow rate and over a longer period of time than by oxygen generators of the prior art. The compositions, methods and devices disclosed herein are ideal for applications where a constant oxygen flow and/or an oxygen flow over an extended period of time is desirable, for example for medical systems providing a patient with oxygen, in mining, submarine and space flight applications, for portable welding devices, control nozzles and other technical applications, but also for conventional applications such as in airplanes, in self-rescuers and in rebreathers.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An oxygen generator, comprising
a composition for generating oxygen, the composition including an oxygen source, a catalyst, an ionic liquid and, if the ionic liquid is acidic, a basic compound;
at least one tuner compact having a core shell structure including a core and one or more shell layers; wherein
a first shell layer completely surrounds the core and each further shell layer completely surrounds a respectively underlying shell layer;
at least one of the core and the one or more shell layers consisting of or comprising a compound selected from the group consisting of a catalyst, an acidic compound, and a basic compound, wherein mixtures comprising both an acidic compound and a basic compound, or comprising both an acidic compound and a catalyst, within the core or within the same shell layer are excluded; and
the core and the one or more shell layers being configured to decompose or dissolve or disintegrate upon coming into contact with the composition for generating oxygen; and
the oxygen source comprising a peroxide compound;
the ionic liquid being in the liquid state at least in a temperature range from −10° C. to +50° C.; and
the catalyst being a metal oxide compound and/or a metal salt, the metal oxide compound being an oxide of a single metal or of two or more different metals selected from the metals of groups 2-14 of the periodic table of elements, and the metal salt comprising one single metal or two or more different metals, and an organic and/or an inorganic anion.

2. The oxygen generator according to claim 1, wherein the tuner compact comprises:
a core and a single shell layer completely surrounding the core; or
a core and a first shell layer completely surrounding the core, and a further shell completely surrounding the first shell layer.

3. The oxygen generator according to claim 1, wherein the core of the tuner compact comprises an acidic compound.

4. The oxygen generator according to claim 1, wherein the core of the tuner compact comprises a basic compound or a peroxide decomposition catalyst.

5. The oxygen generator according to claim 1, wherein at least one of the shell layers of the tuner compact comprises a peroxide compound.

6. The oxygen generator according to claim 1, wherein at least one of the shell layers of the tuner compact comprises a compound which can be dissolved in the composition for generating oxygen, but which does not influence a peroxide decomposition reaction.

7. The oxygen generator according to claim 1, wherein a shell layer of the tuner compact comprises an acidic compound, and wherein:
either the core comprises a basic compound or a peroxide decomposition catalyst; or
a further shell layer comprises a basic compound or a peroxide decomposition catalyst, the further shell layer being closer to the core than the shell layer comprising the acidic compound.

8. A method for tuning an oxygen production rate of a composition for generating oxygen, the method comprising:
providing an oxygen source with a peroxide compound;
providing an ionic liquid that is in the liquid state at least in a temperature range from −10° C. to +50° C.;
providing a catalyst;
providing at least one tuner compact having a core shell structure comprising a core and one or more shell layers, the one or more shell layers having a first shell layer completely surrounding the core, and each further shell layer completely surrounding a respectively underlying shell layer;
at least one of the core and the one or more shell layers consisting of or comprising a compound selected from a peroxide decomposition catalyst, an acidic compound or a basic compound, with mixtures including both an acidic compound and a basic compound or including both an acidic compound and a catalyst within the core or with the same shell layer being excluded; and
the core and the one or more shell layers being configured to decompose or dissolve or disintegrate upon contact with the oxygen source, the ionic liquid and the peroxide decomposition catalyst;
generating oxygen by contacting the oxygen source, the ionic liquid and the peroxide decomposition catalyst, or if the ionic liquid is an acidic liquid, generating oxygen by contacting the oxygen source, the ionic liquid and the peroxide decomposition catalyst with a basic compound; and
contacting the at least one tuner compact with the oxygen source, the ionic liquid, the catalyst and, if present, the basic compound, thereby liberating the compounds contained in the tuner compact, with compounds contained in the outermost shell layer being liberated first and compounds contained in the core being liberated last;
wherein
the metal oxide compound is an oxide of a single metal or of two or more different metals, the metal or the two or more metals being selected from the metals of groups 2 to 14 of the periodic table of the elements; and
the metal salt includes a single metal or two or more different metals, and an organic anion and/or an inorganic anion.

9. The method according to claim 8, wherein the step of tuning the oxygen production rate comprises decelerating or stopping the oxygen production by contacting the oxygen source, the ionic liquid, the peroxide decomposition catalyst and, if present, the basic compound with a tuner compact comprising an acidic compound within the core or within one of the shell layers.

10. The method according to claim 8, wherein the step of tuning the oxygen production rate comprises accelerating the oxygen production by contacting the oxygen source, the ionic liquid, the peroxide decomposition catalyst and, if present, the basic compound with a tuner compact comprising a peroxide decomposition catalyst or a basic compound within a core or within one of the shell layers.

11. The method according to claim 8, wherein the step of tuning the oxygen production rate comprises decelerating or stopping the oxygen production and, at a later point in time, accelerating or restarting the oxygen production by contacting the oxygen source, the ionic liquid, the peroxide decomposition catalyst and, if present, the basic compound, either with a tuner compact having a shell layer comprising an acidic compound and a core comprising a basic compound or a peroxide decomposition catalyst, or having a shell layer comprising an acidic compound and a further shell layer comprising a basic compound or a peroxide decomposition catalyst, wherein the further shell layer is closer to the core,
or with two different tuner compacts including a first tuner compact for liberating the acidic compound at a first point in time, and a second tuner compact for liberating the basic compound or the peroxide decomposition catalyst at a later point in time.

12. The method according to claim 8, wherein the step of tuning the oxygen production rate comprises maintaining the oxygen production rate substantially constant.

13. A device for tuned oxygen generation, the device comprising:
a reaction chamber housing a composition for generating oxygen, the composition including a combination of constituents consisting of an oxygen source, a peroxide decomposition catalyst, an ionic liquid and, if the ionic liquid is an acidic liquid, a basic compound, and said reaction chamber housing at least one tuner compact having a core shell structure with a core and one or more shell layers, wherein:
a first shell layer completely surrounds the core, and each further shell layer completely surrounds a respectively underlying shell layer;
at least one of the core and the one or more shell layers consists of or comprises a compound selected from a peroxide decomposition catalyst, an acidic compound or a basic compound, with mixtures comprising both an acidic compound and a basic compound, or comprising both an acidic compound and a catalyst within the core or within the same shell layer being excluded; and
the core and the one or more shell layers are configured to decompose or dissolve or disintegrate upon contact with the composition for generating oxygen;
means for maintaining at least one of the oxygen source, the peroxide decomposition catalyst, and the ionic liquid physically separated from remaining constituents, or
if the ionic liquid is an acidic liquid, means for maintaining the basic compound physically separated from the ionic liquid,
means for establishing physical contact of the oxygen source, the peroxide decomposition catalyst, the ionic liquid, the at least one tuner compact and, if present, the basic compound, and
means for allowing oxygen to exit the reaction chamber;
wherein
the oxygen source comprises a peroxide compound;
the ionic liquid is in the liquid state at least within a temperature range from −10° C. to +50° C.;
the metal oxide compound is an oxide of a single metal or of two or more different metals selected from the metals of groups 2 to 14 of the periodic table of the elements, and
the metal salt comprises one single metal or two or more different metals, and an organic and/or an inorganic anion.

14. The device according to claim 13, further comprising a device for maintaining the tuner compact physically separated from the ionic liquid.

* * * * *